(12) United States Patent
Yamazaki et al.

(10) Patent No.: US 8,527,008 B2
(45) Date of Patent: *Sep. 3, 2013

(54) WIRELESS COMMUNICATION APPARATUS AND WIRELESS COMMUNICATION METHOD

(75) Inventors: Chiharu Yamazaki, Yokohama (JP); Shigeru Kimura, Yokohama (JP); Fangwei Tong, Yokohama (JP)

(73) Assignee: Kyocera Corporation, Kyoto (JP)

( * ) Notice: Subject to any disclaimer, the term of this patent is extended or adjusted under 35 U.S.C. 154(b) by 469 days.

This patent is subject to a terminal disclaimer.

(21) Appl. No.: 12/679,286

(22) PCT Filed: Sep. 25, 2008

(86) PCT No.: PCT/JP2008/067304
§ 371 (c)(1),
(2), (4) Date: Jul. 16, 2010

(87) PCT Pub. No.: WO2009/041505
PCT Pub. Date: Apr. 2, 2009

(65) Prior Publication Data
US 2010/0279623 A1 Nov. 4, 2010

(30) Foreign Application Priority Data
Sep. 25, 2007 (JP) ................................ 2007-247475
Sep. 28, 2007 (JP) ................................ 2007-255746

(51) Int. Cl.
*H04M 1/00* (2006.01)
*H04L 1/02* (2006.01)
*H04W 4/00* (2009.01)

(52) U.S. Cl.
USPC .................. 455/562.1; 375/267; 370/329

(58) Field of Classification Search
USPC .............. 455/561, 562, 25, 279.1, 132, 135, 455/136, 138, 63.1, 63, 522, 67.11; 370/203, 370/210, 481, 213, 209, 419, 480, 483, 332; 375/267, 299, 347, 260, 219, 316
See application file for complete search history.

(56) References Cited

U.S. PATENT DOCUMENTS
5,867,532 A * 2/1999 Ito et al. .................... 375/265
6,470,194 B1 * 10/2002 Miya et al. ................ 455/562.1
(Continued)

FOREIGN PATENT DOCUMENTS
JP  09-321699   12/1997
JP  2002-043995  2/2002
(Continued)

OTHER PUBLICATIONS
International Search Report for PCT/JP2008/067304, mailed on Dec. 16, 2008, 2 pages.
(Continued)

*Primary Examiner* — Andrew Wendell
*Assistant Examiner* — Cindy Trandai
(74) *Attorney, Agent, or Firm* — Duane Morris LLP

(57) ABSTRACT

A wireless communication apparatus 100 according to the present invention is provided with reception channel coefficient calculation units 120-1 to 120-n for calculating reception channel coefficients of respective antennas, transmission channel coefficient calculation units 130-1 to 130-n for calculating transmission channel coefficients of respective antennas by extrapolation based on variations of the reception channel coefficients, absolute value calculation units 140-1 to 140-n for calculating absolute values of the transmission channel coefficients, a threshold calculation unit 150 for calculating a threshold based on the reception channel coefficients, comparison units 160-1 to 160-n for comparing the absolute values and the threshold, and transmission channel coefficient correction units 170-11 to 170-1n, when the absolute values are greater than the threshold, for correcting the transmission channel coefficients so as to match the absolute values to the threshold.

16 Claims, 22 Drawing Sheets

(56) References Cited

U.S. PATENT DOCUMENTS

| | | | |
|---|---|---|---|
| 6,590,532 B1 | 7/2003 | Ogawa | |
| 7,310,304 B2 | 12/2007 | Mody et al. | |
| 7,911,448 B2 * | 3/2011 | Uchiyama et al. | 345/163 |
| 2003/0152159 A1 * | 8/2003 | Denno | 375/267 |
| 2004/0085929 A1 * | 5/2004 | Azuma | 370/329 |
| 2006/0223476 A1 * | 10/2006 | Song et al. | 455/277.2 |
| 2010/0074318 A1 * | 3/2010 | Kawauchi et al. | 375/232 |
| 2010/0279623 A1 | 11/2010 | Yamazaki et al. | |
| 2010/0317296 A1 | 12/2010 | Yamazaki | |
| 2011/0009064 A1 | 1/2011 | Yamazaki et al. | |
| 2011/0034131 A1 | 2/2011 | Yamazaki | |

FOREIGN PATENT DOCUMENTS

| | | |
|---|---|---|
| JP | 2003-032167 | 1/2003 |
| JP | 2004-343282 | 12/2004 |
| JP | 03644594 | 2/2005 |
| JP | 2005-86444 | 3/2005 |
| JP | 2007-124553 | 5/2007 |
| WO | WO-00-79702 | 12/2000 |
| WO | WO-2006-075547 | 7/2006 |
| WO | WO-2007-142313 | 12/2007 |

OTHER PUBLICATIONS

PCT/JP2008/070420 International Search Report mailed Dec. 9, 2008.

PCT/JP2008/070424 International Search Report mailed Dec. 9, 2008.

PCT/JP2008/072131 International Search Report mailed Feb. 3, 2009.

CN200880117740.6 Office Action mailed Jun. 5, 2012.

JP-547014/2009 Notification of Reasons for Refusal mailed Oct. 4, 2011.

CN200880117619.3 Office Action mailed Jun. 5, 2012.

Office Action for Chinese Patent Appliation No. 200680108445.4, mailed Sep. 5, 2012, 4 pages (including English translation).

* cited by examiner

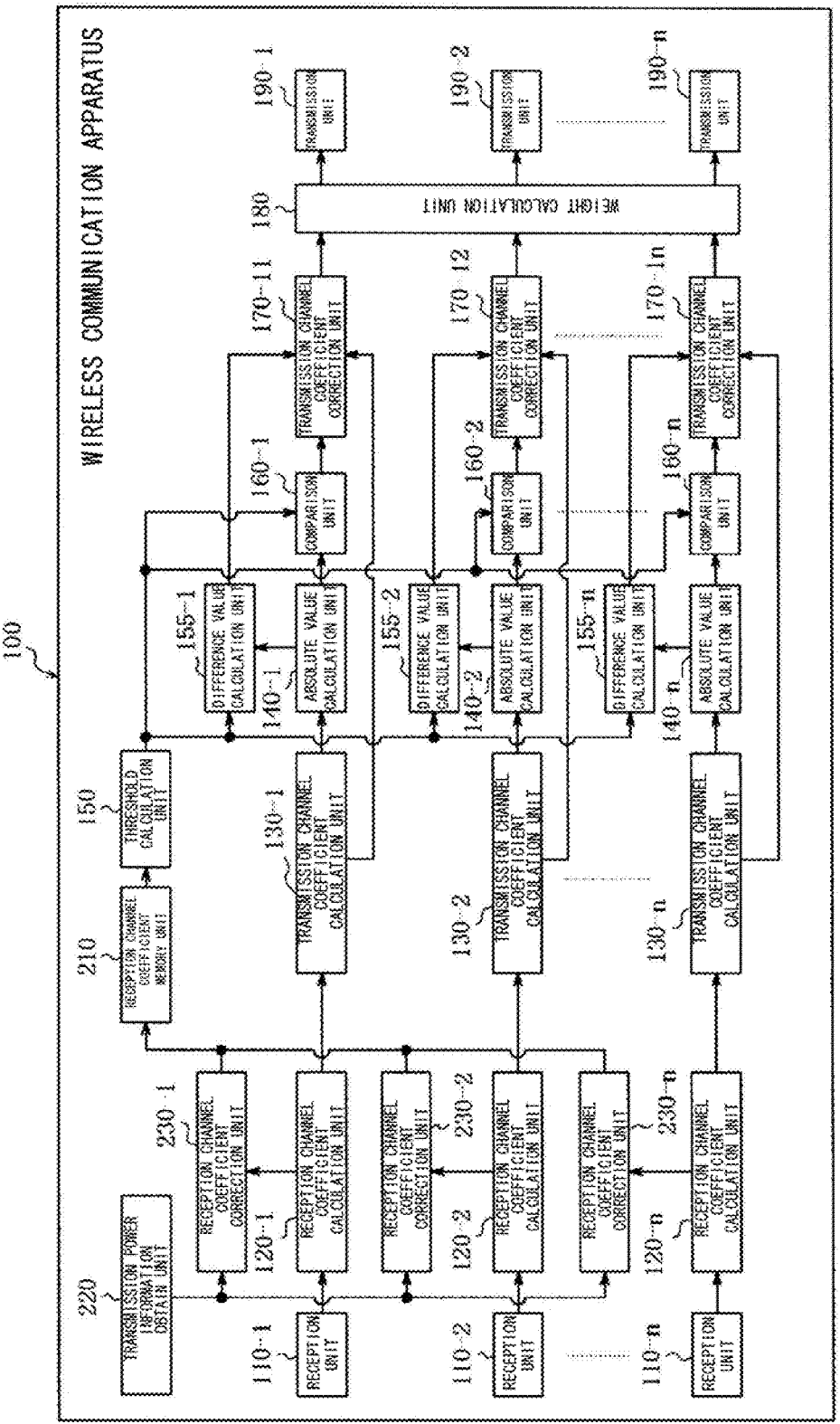

US 8,527,008 B2

WIRELESS COMMUNICATION APPARATUS AND WIRELESS COMMUNICATION METHOD

CROSS REFERENCE TO RELATED APPLICATIONS

This application is a U.S. National Phase of International Application No. PCT/JP2008/067304 (filed on Sep. 25, 2008), which claims priority to and the benefit of Japanese Patent Application No. 2007-247475 (filed on Sep. 25, 2007) and Japanese Patent Application No. 2007-255746 (filed on Sep. 28, 2007), the entire contents of which are incorporated herein by reference.

TECHNICAL FIELD

The present invention relates to a wireless communication apparatus having a plurality of antennas, and a wireless communication method of controlling wireless communication between the wireless communication apparatus having the plurality of antennas and a counterpart wireless communication apparatus.

BACKGROUND ART

As an adaptive control of array weights at transmission conventionally performed by a wireless communication apparatus having a plurality of antennas, there is a method to calculate the array weights by estimating channel coefficients for transmission by an extrapolation process such as a linear extrapolation based on variation of the channel coefficients at reception (for example, Patent Document 1). More specifically, when a reception channel coefficient (absolute value) changes from a point p11 to a point p12 shown in FIG. 10, it is estimated (calculated) that a transmission channel coefficient (absolute value) is at a point p13 in FIG. 10 based on the change of the reception channel coefficient.

Patent Document 1: Japanese Patent No. 3644594

SUMMARY OF INVENTION

Technical Problem

However, when a transmission channel coefficient is estimated by the extrapolation process according to the above conventional art, it may cause a great difference between the transmission channel coefficient estimated and an actual transmission channel coefficient due to fluctuation of the reception channel coefficient. For example, when the reception channel coefficient (absolute value) changes from a point p21 to a point p22 as shown in FIG. 11 and the transmission channel coefficient (absolute value) is estimated (calculated) to be at a point p23 in FIG. 11 based on the change of the reception channel coefficient, although an actual transmission channel coefficient (absolute value) is at a point p24 in FIG. 11, it causes a great estimation error correspondingly to a difference between the points p23 and p24 as shown in the figure.

An object of the present invention is to provide a technique (a wireless communication apparatus and a wireless communication method) which improves calculation accuracy of transmission channel coefficients when the transmission channel coefficients are derived from the reception channel coefficients, by correcting an absolute value of a transmission channel coefficient which is considered to occur with a low probability among absolute values of the transmission channel coefficients calculated.

Solution to Problem

In order to achieve the above object, a wireless communication apparatus having a plurality of antennas according to the present invention includes: a reception channel coefficient calculation unit for calculating a reception channel coefficient of each of the plurality of antennas; a transmission channel coefficient calculation unit for calculating a transmission channel coefficient of each of the plurality of antennas by extrapolation, based on a variation of the reception channel coefficient calculated by the reception channel coefficient calculation unit; an absolute value calculation unit for calculating an absolute value of the transmission channel coefficient calculated by the transmission channel coefficient calculation unit; a threshold calculation unit for calculating a threshold based on the reception channel coefficient calculated by the reception channel coefficient calculation unit; a comparison unit for comparing the absolute value calculated by the absolute value calculation unit and the threshold calculated by the threshold calculation unit; and a correction unit, when the absolute value is greater than the threshold as a result of a comparison by the comparison unit, for correcting the transmission channel coefficient calculated by the transmission channel coefficient calculation unit, so as to match the absolute value to the threshold.

The wireless communication apparatus according to one embodiment of the present invention is characterized in that the correction unit corrects the absolute value of the transmission channel coefficient, while holding a phase component of the transmission channel coefficient calculated by the transmission channel coefficient calculation unit.

The wireless communication apparatus according to another embodiment of the present invention is characterized in further including an extrapolation distance calculation unit for calculating an extrapolation distance based on the reception channel coefficient calculated by the reception channel coefficient calculation unit, the transmission channel coefficient calculated by the transmission channel coefficient calculation unit and the threshold calculated by the threshold calculation unit, wherein the correction unit corrects the transmission channel coefficient calculated by the transmission channel coefficient calculation unit based on the extrapolation distance calculated by the extrapolation distance calculation unit and the reception channel coefficient calculated by the reception channel coefficient calculation unit.

The wireless communication apparatus according to yet another embodiment of the present invention is characterized in further including a channel coefficient memory unit for storing reception channel coefficients for a plurality of frames of each of the plurality of antennas, calculated by the reception channel coefficient calculation unit, wherein the threshold calculation unit calculates the threshold based on the reception channel coefficients for the plurality of frames stored in the channel coefficient memory unit.

The wireless communication apparatus according to yet another embodiment of the present invention is characterized in that the threshold calculation unit calculates the threshold individually for each of the plurality of antennas, and the comparison unit compares the threshold of each of the plurality of antennas calculated by the threshold calculation unit and the absolute value of each of the plurality of antennas calculated by the absolute value calculation unit, with respect to each corresponding antenna.

The wireless communication apparatus according to yet another embodiment of the present invention is characterized in further including a transmission power information obtain unit for obtaining transmission power information of a counterpart wireless communication apparatus and a reception channel coefficient correction unit for correcting the reception channel coefficient calculated by the reception channel coefficient calculation unit, wherein the reception channel coefficient correction unit corrects the reception channel coefficient calculated by the reception channel coefficient calculation unit, based on the transmission power information obtained by the transmission power information obtain unit.

In order to achieve the above object, a wireless communication apparatus having a plurality of antennas according to yet another embodiment of the present invention includes: a reception channel coefficient calculation unit for calculating a reception channel coefficient of each of the plurality of antennas; a transmission channel coefficient calculation unit for calculating a transmission channel coefficient of each of the plurality of antennas by extrapolation, based on a variation of the reception channel coefficient calculated by the reception channel coefficient calculation unit; an absolute value calculation unit for calculating an absolute value of the transmission channel coefficient calculated by the transmission channel coefficient calculation unit; a threshold calculation unit for calculating a threshold based on the reception channel coefficient calculated by the reception channel coefficient calculation unit; a comparison unit for comparing the absolute value calculated by the absolute value calculation unit and the threshold calculated by the threshold calculation unit; a difference value calculation unit for calculating a difference value between the absolute value calculated by the absolute value calculation unit and the threshold calculated by the threshold calculation unit; and a correction unit, when the absolute value is greater than the threshold as a result of a comparison by the comparison unit, for correcting the transmission channel coefficient calculated by the transmission channel coefficient calculation unit based on the difference value calculated by the difference value calculation unit.

The wireless communication apparatus according to yet another embodiment of the present invention is characterized in further including a difference correction value calculation unit for calculating a difference correction value by multiplying the difference value, calculated by the difference value calculation unit, by a correction coefficient, wherein the correction unit corrects the transmission channel coefficient, calculated by the transmission channel coefficient calculation unit, by subtracting the difference correction value calculated by the difference correction value calculation unit from the absolute value calculated by the absolute value calculation unit.

The wireless communication apparatus according to yet another embodiment of the present invention is characterized in that the correction unit corrects the absolute value of the transmission channel coefficient, while holding a phase component of the transmission channel coefficient calculated by the transmission channel coefficient calculation unit.

The wireless communication apparatus according to yet another embodiment of the present invention is characterized in further including a difference correction value calculation unit for calculating a difference correction value by multiplying the difference value, calculated by the difference value calculation unit, by a correction coefficient and a correction ratio calculation unit for calculating a correction ratio by dividing a value, calculated by subtracting the difference correction value calculated by the difference correction value calculation unit from the absolute value calculated by the absolute value calculation unit, by the absolute value, wherein the correction unit corrects the transmission channel coefficient calculated by the transmission channel coefficient calculation unit by multiplying the transmission channel coefficient calculated by the transmission channel coefficient calculation unit by the correction ratio calculated by the correction ratio calculation unit.

The wireless communication apparatus according to yet another embodiment of the present invention is characterized in further including an extrapolation distance calculation unit for calculating an extrapolation distance based on the reception channel coefficient calculated by the reception channel coefficient calculation unit, the transmission channel coefficient calculated by the transmission channel coefficient calculation unit and the difference value calculated by the difference value calculation unit, wherein the correction unit corrects the transmission channel coefficient calculated by the transmission channel coefficient calculation unit, based on the extrapolation distance calculated by the extrapolation distance calculation unit and the reception channel coefficient calculated by the reception channel coefficient calculation unit.

The wireless communication apparatus according to yet another embodiment of the present invention is characterized in further including a channel coefficient memory unit for storing reception channel coefficients for a plurality of frames of each of the plurality of antennas, calculated by the reception channel coefficient calculation unit, wherein the threshold calculation unit calculates the threshold based on the reception channel coefficients for the plurality of frames stored in the channel coefficient memory unit.

The wireless communication apparatus according to yet another embodiment of the present invention is characterized in that the threshold calculation unit individually calculates the threshold for each of the plurality of antennas, and the comparison unit compares the threshold of each of the plurality of antennas calculated by the threshold calculation unit and the absolute value of the transmission channel coefficient of each of the plurality of antennas calculated by the absolute value calculation unit, with respect to each corresponding antenna.

The wireless communication apparatus according to yet another embodiment of the present invention is characterized in further including a transmission power information obtain unit for obtaining transmission power information of a counterpart wireless communication apparatus and a reception channel coefficient correction unit for correcting the reception channel coefficient calculated by the reception channel coefficient calculation unit, wherein the reception channel coefficient correction unit corrects the reception channel coefficient calculated by the reception channel coefficient calculation unit, based on the transmission power information obtained by the transmission power information obtain unit.

In order to achieve the above object, a wireless communication method according to the present invention, for controlling wireless communication between a wireless communication apparatus having a plurality of antennas and a counterpart wireless communication apparatus, includes: a reception channel coefficient calculation step for calculating a reception channel coefficient of each of the plurality of antennas; a transmission channel coefficient calculation step for calculating a transmission channel coefficient of each of the plurality of antennas by extrapolation, based on a variation of the reception channel coefficient calculated at the reception channel coefficient calculation step; an absolute value calculation step for calculating an absolute value of the transmission channel coefficient calculated at the transmission channel coefficient calculation step; a threshold calculation step for calculating a threshold based on the reception channel coefficient calculated at the reception channel coefficient calculation step; and a correction step, when the absolute value is greater than the threshold, for correcting the transmission channel coefficient, calculated at the transmission channel coefficient calculation step, so as to match the absolute value to the threshold.

In order to achieve the above object, a wireless communication method according to one embodiment the present invention, for controlling wireless communication between a wireless communication apparatus having a plurality of antennas and a counterpart wireless communication apparatus, includes: a reception channel coefficient calculation step for calculating a reception channel coefficient of each of the plurality of antennas; a transmission channel coefficient calculation step for calculating a transmission channel coefficient of each of the plurality of antennas by extrapolation, based on a variation of the reception channel coefficient calculated at the reception channel coefficient calculation step; an absolute value calculation step for calculating an absolute value of the transmission channel coefficient calculated at the transmission channel coefficient calculation step; a threshold calculation step for calculating a threshold based on the reception channel coefficient calculated at the reception channel coefficient calculation step; a difference value calculation step for calculating a difference value between the absolute value calculated at the absolute value calculation step and the threshold calculated at the threshold calculation step; and a correction step, when the absolute value is greater than the threshold, for correcting the transmission channel coefficient calculated at the transmission channel coefficient calculation step, based on the difference value calculated at the difference value calculation step.

Advantageous Effects on Invention

According to the present invention, when an absolute value of a transmission channel coefficient is greater than the threshold, the correction unit corrects the transmission channel coefficient calculated by the transmission channel coefficient calculation unit so as to match the absolute value to the threshold. Therefore, an absolute value of the transmission channel coefficient, which is considered to occur with a low probability among the absolute values of the transmission channel coefficients calculated, is corrected, it is thus possible to reduce a calculation error (estimation error) of the transmission channel coefficients. Accordingly, it is possible to provide technique (the wireless communication apparatus and the wireless communication method) which improves calculation accuracy of the transmission channel coefficients.

According to the present invention, when an absolute value of a transmission channel coefficient is greater than the threshold, the correction unit corrects the transmission channel coefficient calculated by the transmission channel coefficient calculation unit, based on the difference value calculated by the difference value calculation unit. Therefore, the absolute value of the transmission channel coefficient, which is considered to occur with a low probability among the absolute values of the transmission channel coefficients calculated, is corrected, it is thus possible to reduce the calculation error (estimation error) of the transmission channel coefficients. Accordingly, it is possible to provide technique (the wireless communication apparatus and the wireless communication method) which improves calculation accuracy of the transmission channel coefficients.

BRIEF DESCRIPTION OF DRAWINGS

FIG. 22 is a block diagram illustrating a schematic constitution of a wireless communication apparatus according to a thirteenth embodiment applying the wireless communication method of the present invention.

DESCRIPTION OF EMBODIMENTS

Embodiments of the present invention will be described with reference to the accompanying drawings.

Embodiment 1

Figure 1:
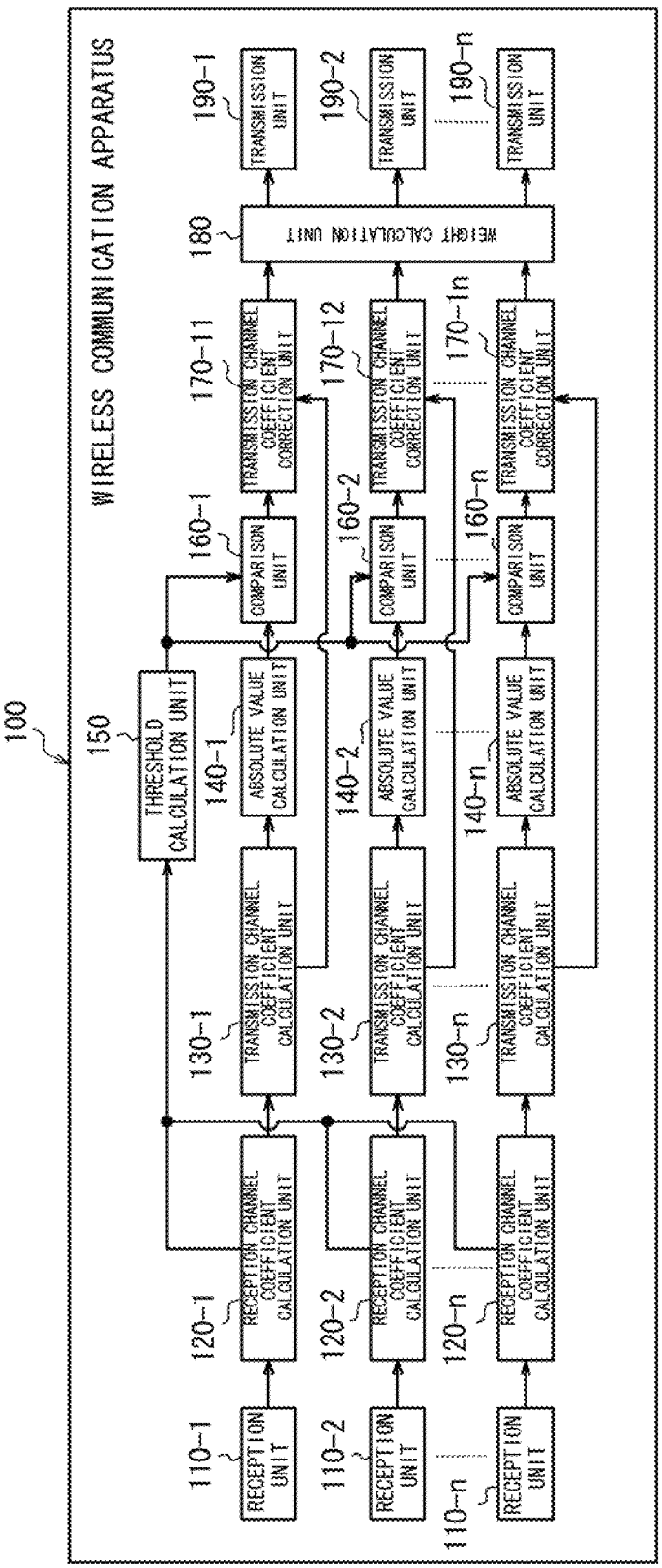
FIG. 1 is a block diagram illustrating a schematic constitution of a wireless communication apparatus according to a first embodiment applying a wireless communication method of the present invention.

FIG. 1 is a block diagram illustrating a schematic constitution of a wireless communication apparatus according to a first embodiment applying a wireless communication method of the present invention. A wireless communication apparatus 100 according to the present embodiment is the wireless communication apparatus (hereinafter referred to also as a base station) having a plurality of antennas (not shown). The wireless communication apparatus 100 is provided with reception units 110-1 and 110-2 to 110-$n$ for receiving radio signals transmitted from a counterpart wireless communication apparatus (not shown, hereinafter referred to also as a terminal) via the plurality of antennas, reception channel coefficient calculation units 120-1 and 120-2 to 120-$n$ for calculating reception channel coefficients (reception channel coefficients of the respective plurality of antennas) in relation to the counterpart wireless communication apparatus based on the signals received by the reception units 110-1 and 110-2 to 110-$n$, transmission channel coefficient calculation units 130-1 and 130-2 to 130-$n$ for calculating (estimating), by extrapolation (for example, linear extrapolation), transmission channel coefficients (reception channel coefficients of the respective plurality of antennas) in relation to the counterpart wireless communication apparatus based on variations of the reception channel coefficients calculated by the reception channel coefficient calculation units 120-1 and 120-2 to 120-$n$, absolute value calculation units 140-1 and 140-2 to 140-$n$ for calculating absolute values of the transmission channel coefficients calculated by the transmission channel coefficient calculation units 130-1 and 130-2 to 130-$n$, a threshold calculation unit 150 for calculating a threshold based on the reception channel coefficients calculated by the reception channel coefficient calculation units 120-1 and 120-2 to 120-$n$, comparison units 160-1 and 160-2 to 160-$n$ for comparing the absolute values calculated by the absolute value calculation units 140-1 and 140-2 to 140-$n$ and the threshold calculated by the threshold calculation unit 150, transmission channel coefficient correction units 170-11 and 170-12 to 170-1$n$ for correcting the transmission channel coefficients calculated by the transmission channel coefficient calculation units 130-1 and 130-2 to 130-$n$, a weight calculation unit 180 for calculating weights based on the transmission channel coefficients corrected by the transmission channel coefficient correction units 170-11 and 170-12 to 170-1$n$, and transmission units 190-1 and 190-2 to 190-$n$ transmitting radio signals, based on the transmission channel coefficients corrected by the transmission channel coefficient correction units 170-11 and 170-12 to 170-1$n$ and the weights calculated by the weight calculation unit 180, via the plurality of antennas.

The threshold calculation unit 150 calculates a greatest absolute value, among absolute values of the reception channel coefficients calculated by the reception channel coefficient calculation units 120-1 and 120-2 to 120-$n$, as the threshold.

The transmission channel coefficient correction units 170-11 and 170-2 to 170-1$n$, when the absolute values are greater than the threshold as results of comparisons by the comparison units 160-1 and 160-2 to 160-$n$, correct the transmission channel coefficients calculated by the transmission channel coefficient calculation units 130-1 to 130-$n$, respectively, so as to match the absolute values to the threshold.

Figure 2:
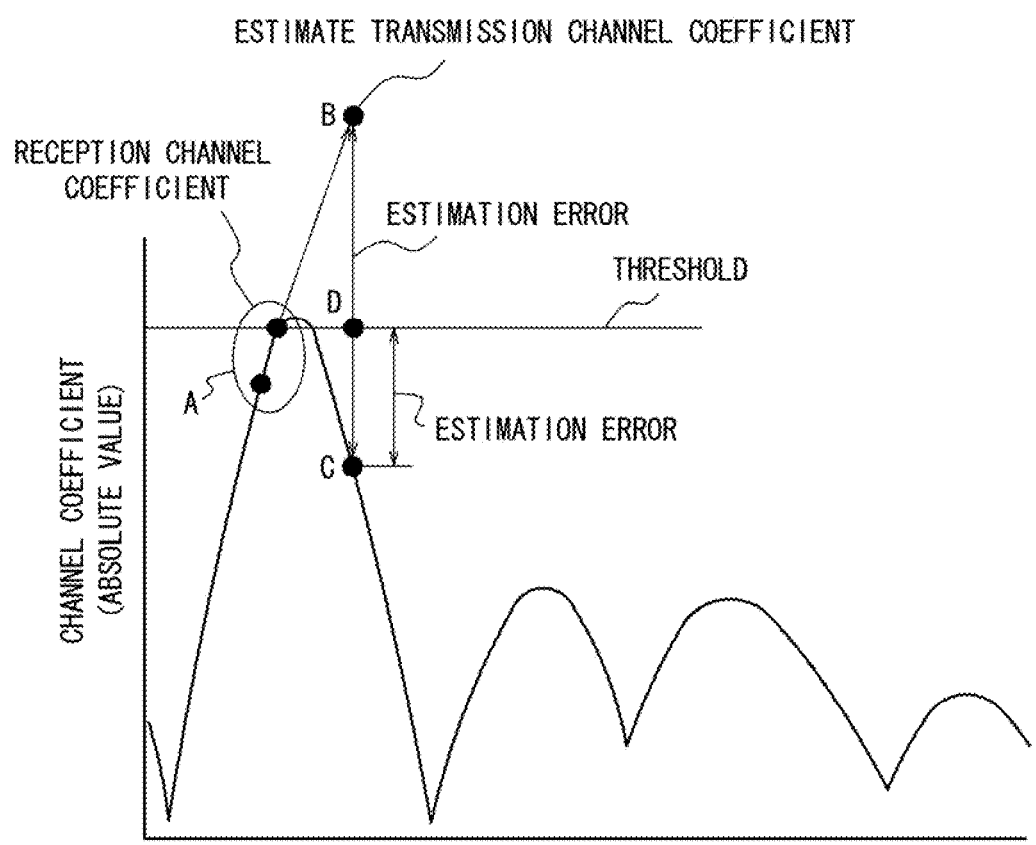
FIG. 2 is a diagram illustrating an example of a fluctuation of a transmission channel coefficient for explaining a correcting operation of the transmission channel coefficient according to the first embodiment.

Next, a correcting operation of the transmission channel coefficient according to the first embodiment is explained based on FIG. 2.

Under circumstances with a number of scattering objects such as in an urban area, channel coefficients (the reception channel coefficients and the transmission channel coefficients) between the wireless communication apparatus (base station) 100 and the counterpart wireless communication apparatus (terminal) independently fluctuate in accordance with Rayleigh distribution. In such a condition, when there is no great changes in a distance between the wireless communication apparatus 100 and the counterpart wireless communication apparatus, transmission power from the counterpart wireless communication apparatus or arrangement of the scattering objects around the wireless communication apparatus 100, the probability of a transmission channel coefficient whose absolute value is greater than a certain value being generated is very low. Whereas, when the transmission channel coefficient is estimated (calculated) by linear extrapolation and the likes, there is "a case where a transmission channel coefficient greater than a certain absolute value is calculated (hereinafter referred to as a case 1)", although a possibility that such a transmission channel coefficient occurs at transmission is very low.

Such a calculation (estimation) of the transmission channel coefficient as the above case 1 means that the transmission channel coefficient is estimated (calculated) as a point B in FIG. 2 from a variation (increase in the absolute value, in this case) of the reception channel coefficient shown as a part A in FIG. 2. In this case, if a point C in FIG. 2 is a transmission channel coefficient which should be estimated originally, an estimation error between an "actual transmission channel coefficient" and an "estimated (calculated) transmission channel coefficient" corresponds to a distance between the point B and the point C, which is a great estimation error.

As a countermeasure, the transmission channel coefficient correction units 170-11 and 170-12 to 170-1$n$, when the transmission channel coefficient such as the point B shown in FIG. 2 is estimated (calculated), correct the absolute values of the transmission channel coefficients calculated by the transmission channel coefficient calculation units 130-1 and 130-2 to 130-*n* so as to match the absolute values to the threshold calculated by the threshold calculation unit 150 (namely, so as to return to a point D in FIG. 2 which corresponds to the threshold). Thereby, the estimation error is minimized to a distance between the point D and the point C.

According to the first embodiment, it is possible to reduce the calculation error (estimation error) of the transmission channel coefficient, by correcting the absolute value of the transmission channel coefficient, which is considered to occur with a low probability, among the absolute values of the transmission channel coefficients calculated (estimated) by extrapolation (the linear extrapolation, for example). Since the calculation error (estimation error) of the transmission channel coefficient is minimized, it is possible to improve calculation accuracy (estimation accuracy) of the transmission channel coefficient. Hence, it is possible to obtain good communication quality by preventing deterioration of communication quality caused by the fluctuation of the transmission channel coefficient because of rapid movement of the counterpart wireless communication apparatus (terminal) and the likes.

Embodiment 2

Figure 3:
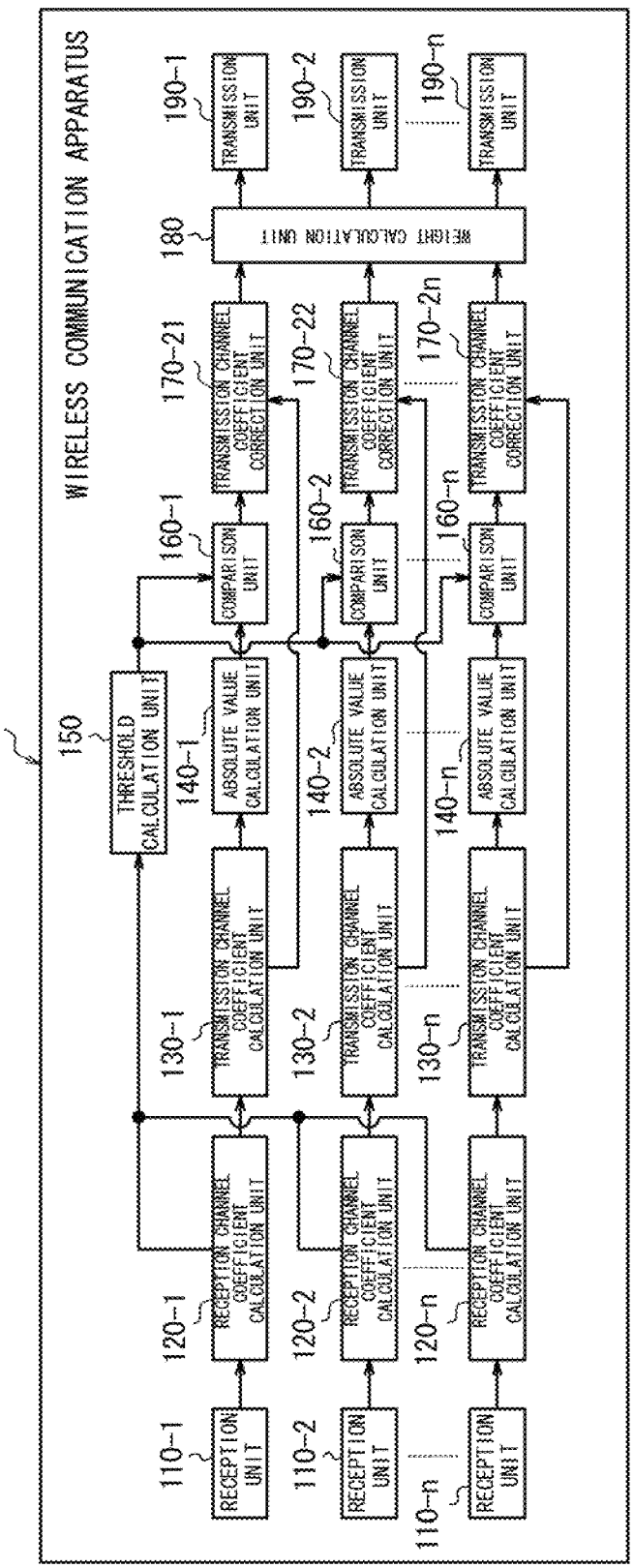
FIG. 3 is a block diagram illustrating a schematic constitution of a wireless communication apparatus according to a second embodiment applying the wireless communication method of the present invention.

FIG. 3 is a block diagram illustrating a schematic constitution of a wireless communication apparatus according to a second embodiment applying the wireless communication method of the present invention. A wireless communication apparatus 100 according to the present embodiment has the same constitution as the wireless communication apparatus 100 of the above first embodiment, except for having transmission channel coefficient correction units 170-21 and 170-22 to 170-2*n* in place of the transmission channel coefficient correction units 170-11 and 170-12 to 170-1*n*.

When the absolute values are greater than the threshold as results of comparisons by the comparison units 160-1 and 160-2 to 160-*n*, the transmission channel coefficient correction units 170-21 and 170-22 to 170-2*n* correct the transmission channel coefficients calculated by the transmission channel coefficient calculation units 130-1 and 130-2 to 130-*n*, respectively, based on the following Formula (1). At this time, the transmission channel coefficient correction units 170-21 and 170-21 to 170-2*n* correct the absolute values of the transmission channel coefficients, while holding the phase components of the transmission channel coefficients calculated by the transmission channel coefficient calculation units 130-1 and 130-2 to 130-*n*.

Figure 4:
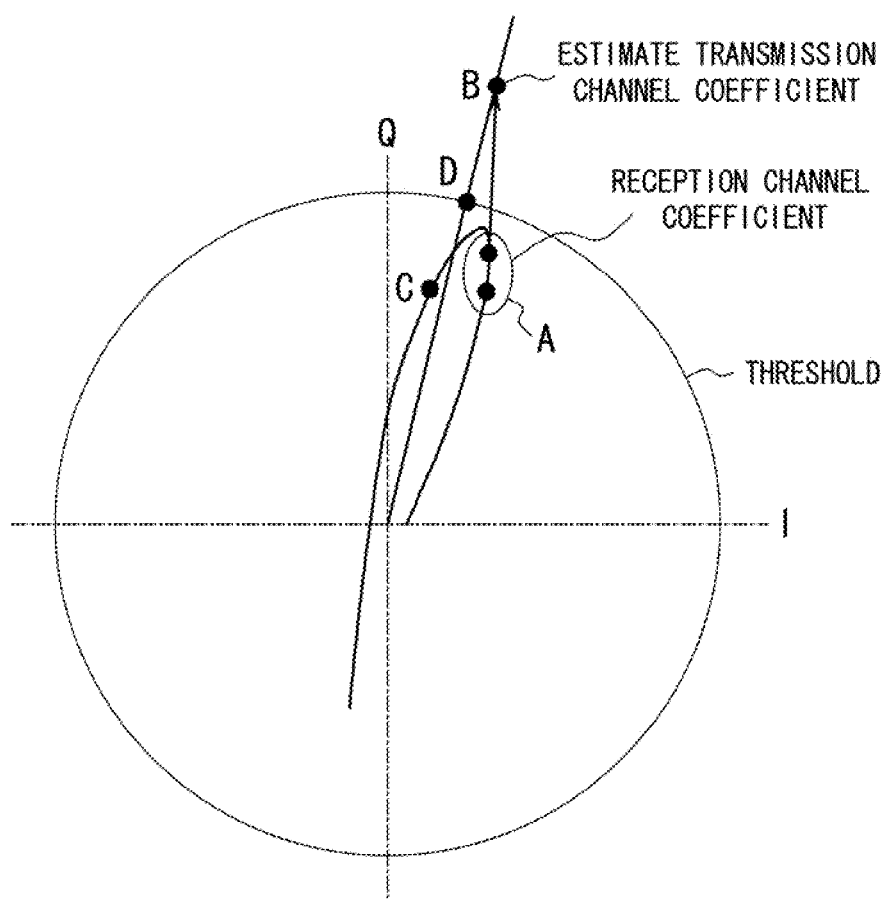
FIG. 4 is a diagram illustrating an example of the fluctuation of the transmission channel coefficient on a complex plane, for explaining the correcting operation of the transmission channel coefficient according to the second embodiment.

[Formula 1]

$$\hat{H}_i = H_i \times (A/|H_i|) \quad (1)$$

provided that
$\hat{H}_i$: complex channel coefficient after correction
$H_i$: complex channel coefficient before correction
A: threshold
| |: absolute value operation Next, the correcting operation of the transmission channel coefficient according to the second embodiment is explained based on FIG. 4.

Such a calculation (estimation) of the transmission channel coefficient as the above case 1 means that the transmission channel coefficient is estimated (calculated) as a point B in FIG. 4 from a variation (increase in the absolute value, in this case) of the reception channel coefficient shown as a part A in FIG. 4. In this case, if a point C in FIG. 4 is a transmission channel coefficient which should be estimated originally, the estimation error between the "actual transmission channel coefficient" and the "estimated (calculated) transmission channel coefficient" corresponds to the distance between the point B and the point C, which is the great estimation error.

As the countermeasure, the transmission channel coefficient correction units 170-21 and 170-22 to 170-2*n*, when estimation (calculation) of the transmission channel coefficient such as the point B shown in FIG. 4 is made, correct the transmission channel coefficient calculated by the transmission channel coefficient calculation unit 130-1 and 130-2 to 130-*n* (namely, correct them to a point D in FIG. 4 which corresponds to the threshold), by use of the formula (1) based on "a ratio of the absolute value of the transmission channel coefficient to the threshold calculated by the threshold calculation unit 150", while holding the phase component of the transmission channel coefficient. Thereby, the estimation error is minimized to a distance between the point D and the point C.

According to the second embodiment, it is possible to reduce the calculation error (estimation error) of the transmission channel coefficient, by correcting the absolute value of the transmission channel coefficient, which is considered to occur with a low probability, among the absolute values of the transmission channel coefficients calculated (estimated) by extrapolation (the linear extrapolation, for example), in consideration of a phase variation on a propagation channel. Since the calculation error (estimation error) of the transmission channel coefficient is minimized, it is possible to improve calculation accuracy (estimation accuracy) of the transmission channel coefficient. Hence, it is possible to obtain good communication quality by preventing deterioration of communication quality caused by the fluctuation of the transmission channel coefficient because of rapid movement of the counterpart wireless communication apparatus (terminal) and the likes.

Embodiment 3

Figure 5:
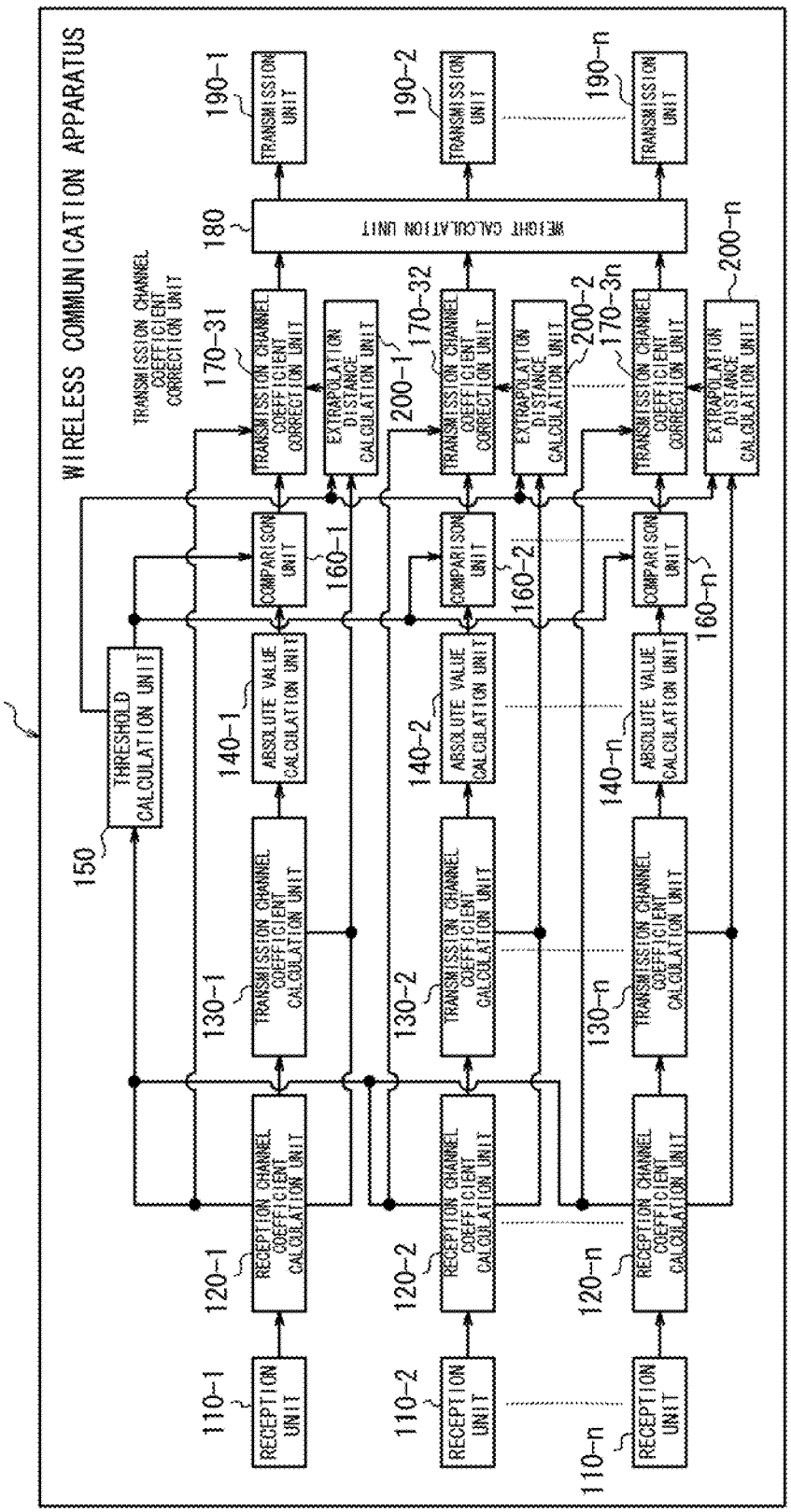
FIG. 5 is a block diagram illustrating a schematic constitution of a wireless communication apparatus according to a third embodiment applying the wireless communication method of the present invention.

FIG. 5 is a block diagram illustrating a schematic constitution of a wireless communication apparatus according to a third embodiment applying the wireless communication method of the present invention. A wireless communication apparatus 100 according to the present embodiment has the same constitution as the wireless communication apparatus 100 of the first embodiment, except for having extrapolation distance calculation units 200-1 and 200-2 to 200-*n* in addition, and transmission channel coefficient correction units 170-31 and 170-32 to 170-3*n* in place of the transmission channel coefficient correction units 170-11 and 170-12 to 170-1*n*.

The extrapolation distance calculation units 200-1 and 200-2 to 200-*n* calculate extrapolation distances based on the reception channel coefficients, the transmission channel coefficients and the threshold, so as to satisfy the following formula (2).

[Formula 2]

$$\left| H_i + \left( L \times \frac{dH_i}{dt} \right) \right| = A \quad (2)$$

provided that
L: extrapolation distance
$H_i$: complex channel coefficient at reception dHi/dt: variation of complex channel coefficient at reception
| |: absolute value operation
A: threshold When the absolute values are greater than the threshold as results of the comparisons by the comparison units 160-1 and 160-2 to 160-$n$, the transmission channel coefficient correction units 170-31 and 170-32 to 170-3$n$ correct the transmission channel coefficients calculated by the transmission channel coefficient calculation units 130-1 and 130-2 to 130-$n$ by use of the following formula (3) based on the reception channel coefficients and the extrapolation distances, so as to match the absolute values to the threshold.

Figure 6:
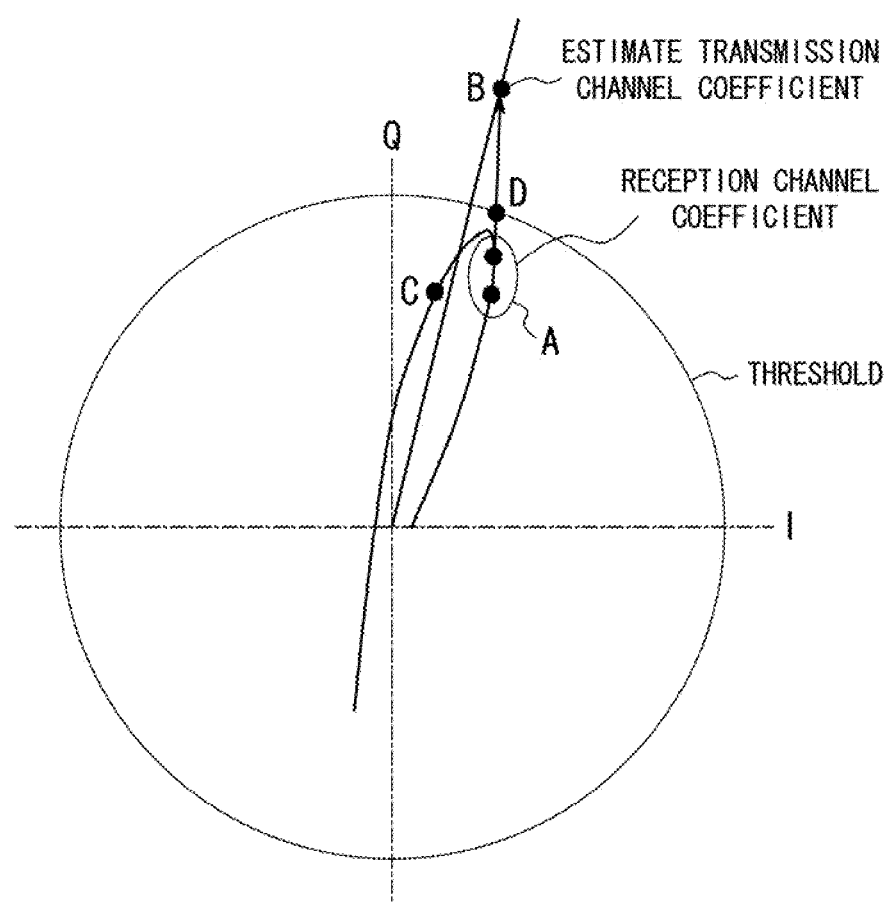
FIG. 6 is a diagram illustrating an example of the fluctuation of the transmission channel coefficient on the complex plane, for explaining the correcting operation of the transmission channel coefficient according to the third embodiment.

[Formula 3]

$$\hat{H}_i = H_i + \left( L \times \frac{dH_i}{dt} \right) \quad (3)$$

provided that
$\hat{H}_i$: complex channel coefficient after correction
$H_i$: complex channel coefficient at reception
L: extrapolation distance calculated by extrapolation distance calculation unit
dHi/dt: variation of complex channel coefficient at reception Next, the correcting operation of the transmission channel coefficient according to the third embodiment is explained based on FIG. 6.

Such a calculation (estimation) of the transmission channel coefficient as the above case 1 means that the transmission channel coefficient is estimated (calculated) as a point B in FIG. 6 from a variation (increase in the absolute value, in this case) of the reception channel coefficient shown as a part A in FIG. 6. In this case, if a point C in FIG. 6 is a transmission channel coefficient which should be estimated originally, the estimation error between the "actual transmission channel coefficient" and the "estimated (calculated) transmission channel coefficient" corresponds to the distance between the point B and the point C, which is the great estimation error.

As the countermeasure, the transmission channel coefficient correction units 170-31 and 170-32 to 170-3$n$, when the transmission channel coefficient such as the point B shown in FIG. 6 is estimated (calculated), correct the transmission channel coefficients calculated by the transmission channel coefficient calculation units 130-1 and 130-2 to 130-$n$ by use of the formula (3) (namely, correct them to a point D in FIG. 6 which corresponds to the threshold), based on the extrapolation distance and a variation of the complex channel coefficient at reception, while holding the phase components of the transmission channel coefficients. Thereby, the estimation error is minimized to a distance between the point D and the point C.

According to the third embodiment, by correcting the absolute value of the transmission channel coefficient which is considered to occur with a low probability, among the absolute values of the transmission channel coefficients calculated (estimated) by extrapolation (linear extrapolation, for example), even in consideration of the phase variation of the propagation channel, it is thus possible to reduce the calculation error (estimation error) of the transmission propagation coefficient. Since the calculation error (estimation error) of the transmission propagation coefficient is minimized, it is possible to improve calculation accuracy (estimation accuracy) of the transmission propagation coefficient. Hence, it is possible to obtain good communication quality by preventing deterioration of communication quality caused by the fluctuation of the transmission channel coefficient because of rapid movement of the counterpart wireless communication apparatus (terminal) and the likes.

Embodiment 4

Figure 7:
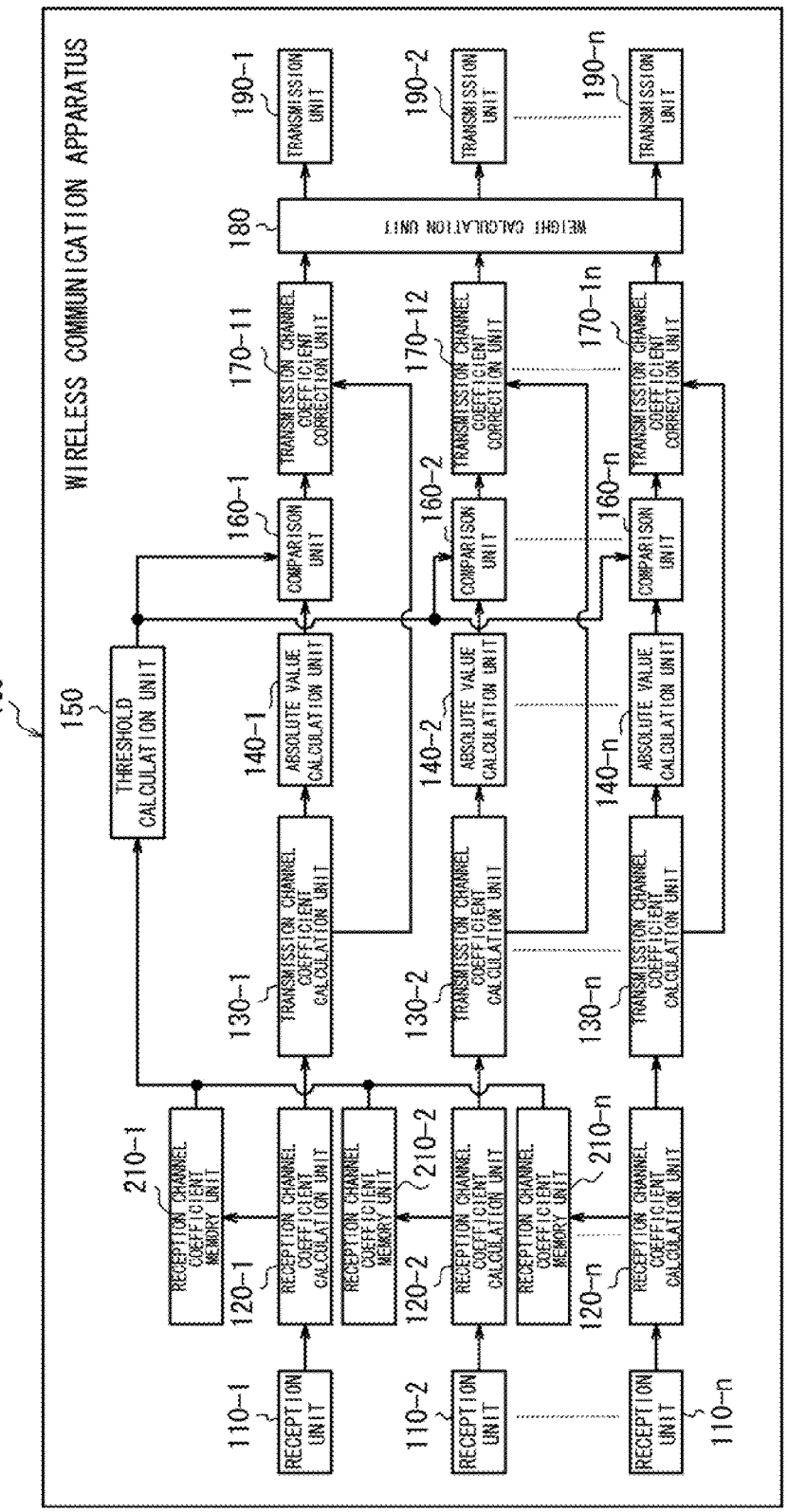
FIG. 7 is a block diagram illustrating a schematic constitution of a wireless communication apparatus according to a fourth embodiment applying the wireless communication method of the present invention.

FIG. 7 is a block diagram illustrating a schematic constitution of a wireless communication apparatus according to a fourth embodiment applying the wireless communication method of the present invention. A wireless communication apparatus 100 has the same constitution as the wireless communication apparatus 100 of the first embodiment, except for having reception channel coefficient memory units 210-1 and 210-2 to 210-$n$ in addition.

The reception channel coefficient memory units 210-1 and 210-2 to 210$n$ store reception channel coefficients respectively calculated by the reception channel coefficients calculation units 120-1 and 120-2 to 120-$n$, for a plurality of frames. The threshold calculation unit 150 calculates a greatest absolute value as the threshold, among the absolute values of the reception channel coefficients for the plurality of frames stored in the reception channel coefficient memory units 210-1 and 210-2 to 210-$n$.

According to the fourth embodiment, by correcting the absolute value of the transmission channel coefficient which is considered to occur with a low probability, among the absolute values of the transmission channel coefficients calculated (estimated) by extrapolation (linear extrapolation, for example), it is thus possible to reduce the calculation error (estimation error) of the transmission channel coefficient. Since the calculation error (estimation error) of the transmission channel coefficient is minimized, it is possible to improve calculation accuracy (estimation accuracy) of the transmission channel coefficient. Moreover, accuracy of the threshold can be improved, as the threshold is calculated using the absolute values of the reception channel coefficients for the plurality of frames. Hence, it is possible to obtain good communication quality by preventing deterioration of communication quality caused by the fluctuation of the transmission channel coefficient because of rapid movement of the counterpart wireless communication apparatus (terminal) and the likes.

Embodiment 5

Figure 8:
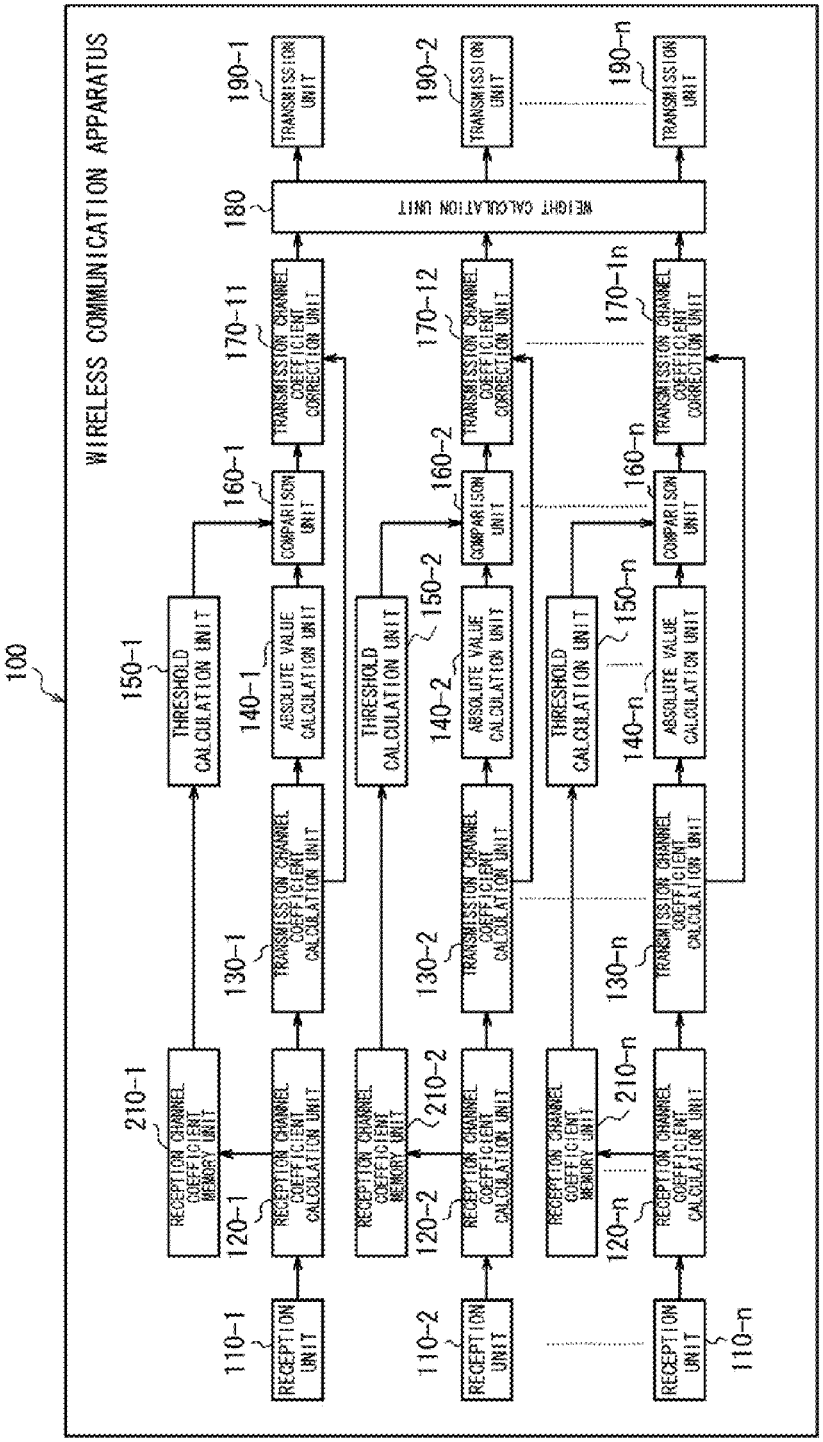
FIG. 8 is a block diagram illustrating a schematic constitution of a wireless communication apparatus according to a fifth embodiment applying the wireless communication method of the present invention.

FIG. 8 is a block diagram illustrating a schematic constitution of a wireless communication apparatus according to a fifth embodiment applying the wireless communication method of the present invention. A wireless communication apparatus 100 has the same constitution as the wireless communication apparatus 100 of the above fourth embodiment, except for having threshold calculation units 150-1 and 150-2 to 150-$n$ in place of the threshold calculation unit 150 commonly provided to the reception channel coefficient memory units 210-1 and 210-2 to 210-$n$.

Each of the threshold calculation units 150-1 and 150-2 to 150-$n$ calculates a greatest absolute value as the threshold among the absolute values of the reception channel coefficients for the plurality of frames stored in each of the reception channel coefficient memory units 210-1 and 210-2 to 210-$n$.

According to the fifth embodiment, by correcting the absolute value of the transmission channel coefficient which is considered to occur with a low probability, among the absolute values of the transmission channel coefficients calculated (estimated) by extrapolation (linear extrapolation, for example), it is thus possible to reduce the calculation error (estimation error) of the transmission channel coefficient. Since the calculation error (estimation error) of the transmission channel coefficient is minimized, it is possible to improve calculation accuracy (estimation accuracy) of the transmission channel coefficient. Moreover, accuracy of the threshold can be improved, as the threshold is calculated using the absolute values of the reception channel coefficients for the plurality of frames. Furthermore, even in a case where distribution of the reception channel coefficients in relation to the counterpart wireless communication apparatus (terminal) is different for each antenna because of influence of shadowing and the likes, it is possible to correct the absolute value of the transmission channel coefficient efficiently. Hence, it is possible to obtain good communication quality by preventing deterioration of communication quality caused by the fluctuation of the transmission channel coefficient because of rapid movement of the counterpart wireless communication apparatus (terminal) and the likes.

Embodiment 6

Figure 9:
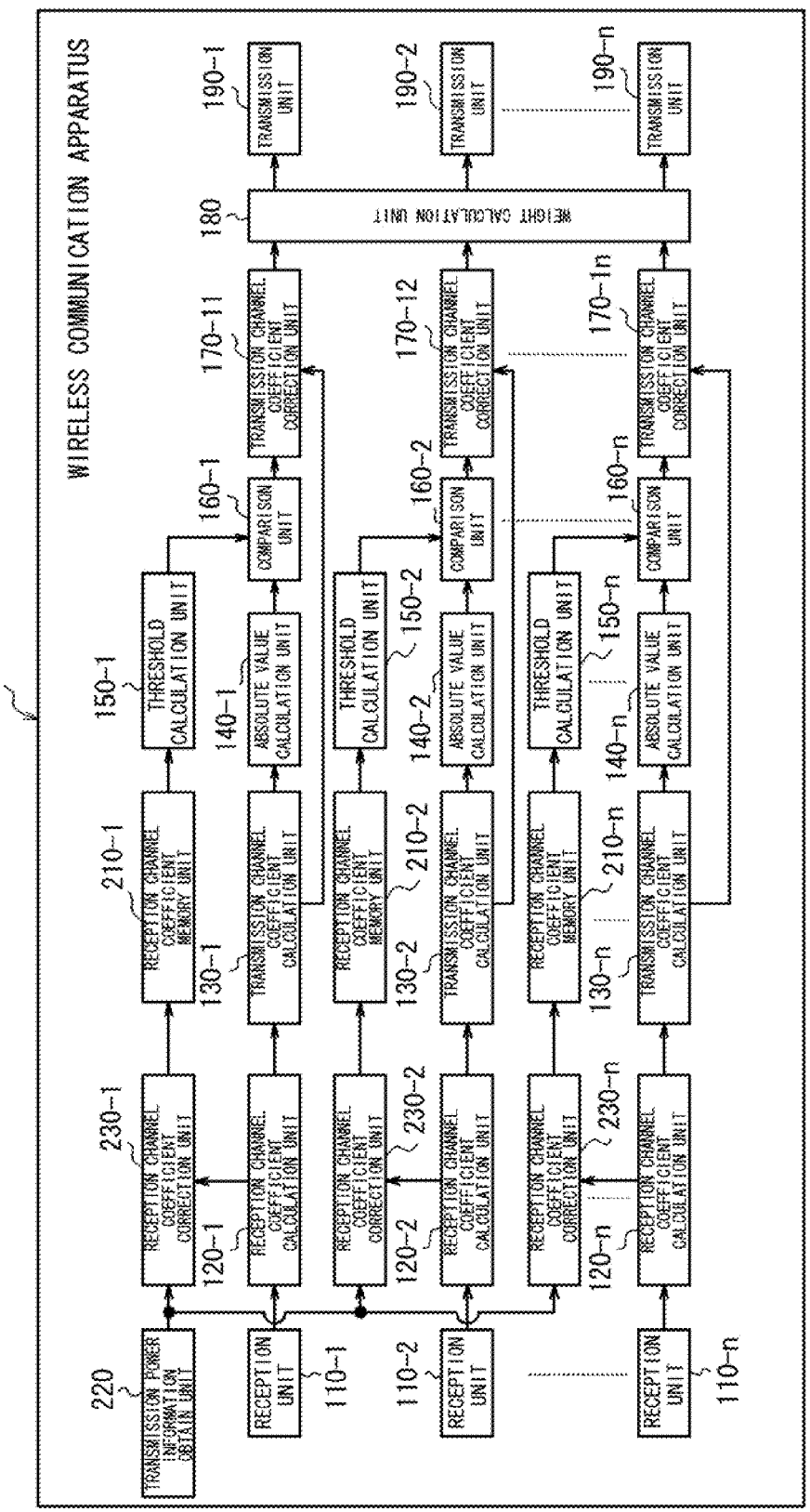
FIG. 9 is a block diagram illustrating a schematic constitution of a wireless communication apparatus according to a sixth embodiment applying the wireless communication method of the present invention.
Figure 10:
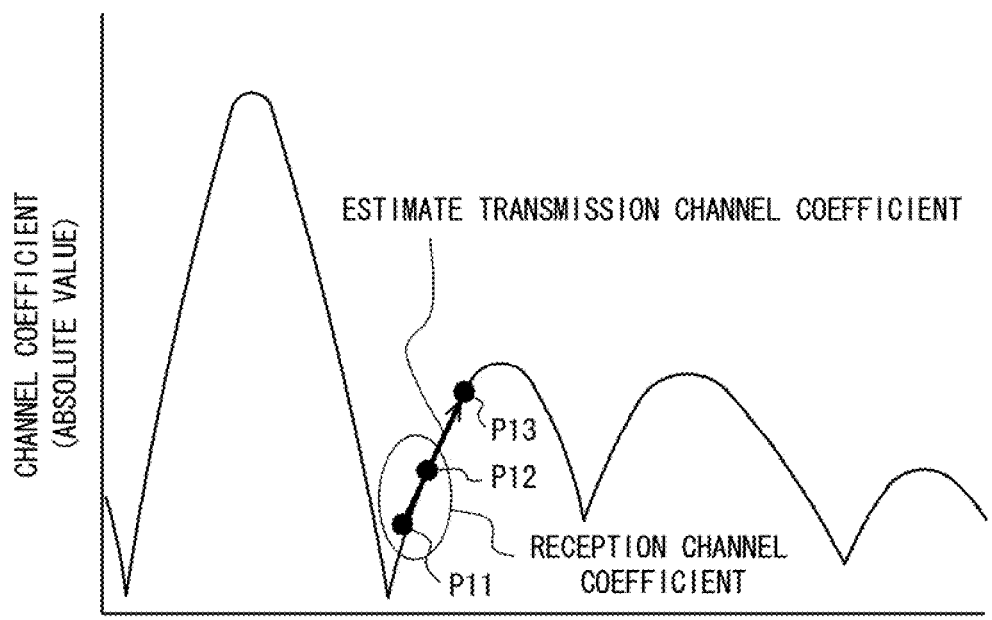
FIG. 10 is a diagram for explaining a conventional art which estimates the transmission channel coefficient by an extrapolation process.
Figure 11:
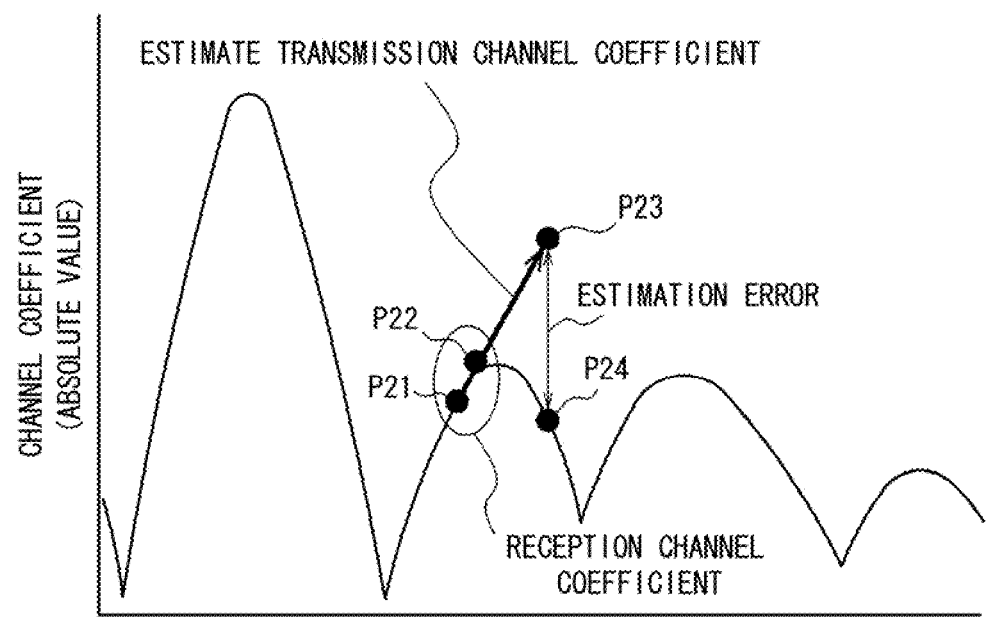
FIG. 11 is a diagram for explaining a great estimation error by the conventional art which estimates the transmission channel coefficient by the extrapolation process.

FIG. 9 is a block diagram illustrating a schematic constitution of a wireless communication apparatus according to a sixth embodiment applying the wireless communication method of the present invention. A wireless communication apparatus 100 has the same constitution as the wireless communication apparatus 100 of the above fifth embodiment, except for having a transmission power information obtain unit 220 and reception channel coefficient correction units 230-1 and 230-2 to 230-n in addition.

The transmission power information obtain unit 220 obtains transmission power information from the counterpart wireless communication apparatus (terminal).

The reception channel coefficient correction units 230-1 and 230-2 to 230-n correct reception channel coefficients calculated by the reception channel coefficient calculation units 120-1 and 120-2 to 120-n, based on the transmission power information obtained by the transmission power information obtain unit 220. The reception channel coefficient memory units 210-1 and 210-2 to 210-n store the reception channel coefficients corrected by the reception channel coefficient correction units 230-1 and 230-2 to 230-n.

According to the sixth embodiment, by correcting the absolute value of the transmission channel coefficient which is considered to occur with a low probability, among the absolute values of the transmission channel coefficients calculated (estimated) by extrapolation (linear extrapolation, for example), it is thus possible to reduce the calculation error (estimation error) of the transmission channel coefficient. Since the calculation error (estimation error) of the transmission channel coefficient is minimized, it is possible to improve calculation accuracy (estimation accuracy) of the transmission channel coefficient. Moreover, accuracy of the threshold can be improved, as the threshold is calculated by use of the absolute values of the reception channel coefficients for the plurality of frames. Furthermore, even in a case where transmission power of the counterpart wireless communication apparatus (terminal) is different for each frame, it is possible to correct the absolute value of the transmission channel coefficient. Hence, it is possible to obtain good communication quality by preventing deterioration of communication quality caused by the fluctuation of the transmission channel coefficient because of rapid movement of the counterpart wireless communication apparatus (terminal) and the likes.

It is to be understood that the thresholds calculated by the threshold calculation units 150, 150-1 and 150-2 to 150-n are not limited to "the greatest absolute value among the absolute values of the reception channel coefficients" but may be a result of addition of a predetermined value to the greatest absolute value or a result of subtraction of a predetermined value from the greatest absolute value. In addition, extrapolation used by the transmission channel coefficient calculation units 130-1 and 130-2 to 130-n for calculation of the transmission channel coefficient is not limited to "linear extrapolation" but may other extrapolation methods.

Embodiment 7

Figure 12:
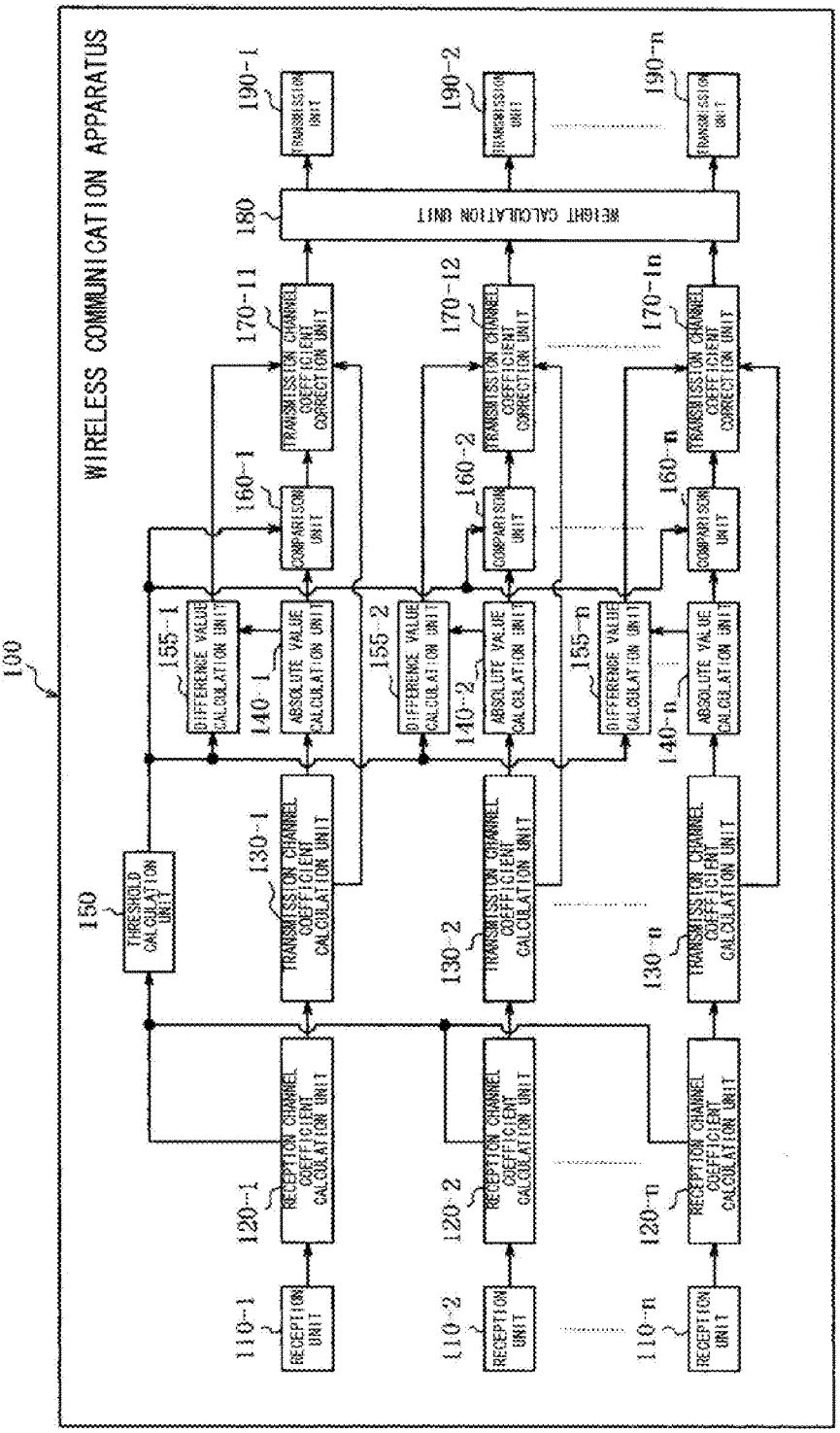
FIG. 12 is a block diagram illustrating a schematic constitution of a wireless communication apparatus according to a seventh embodiment applying the wireless communication method of the present invention.

FIG. 12 is a block diagram illustrating a schematic constitution of a wireless communication apparatus of a seventh embodiment adopting the wireless communication method according to the present invention. A wireless communication apparatus 100 according to the present embodiment is the wireless communication apparatus (hereinafter referred to also as the base station) having the plurality of antennas (not shown). The wireless communication apparatus 100 is provided with reception units 110-1 and 110-2 to 110-n for receiving radio signals transmitted from a counterpart wireless communication apparatus (hereinafter referred to also as a terminal), which is not shown in the figure, via the plurality of antennas, reception channel coefficient calculation units 120-1 and 120-2 to 120-n for calculating reception channel coefficients (reception channel coefficients of the respective plurality of antennas) in relation to the counterpart wireless communication apparatus based on the signals received by the reception units 110-1 and 110-2 to 110-n, transmission channel coefficient calculation units 130-1 and 130-2 to 130-n for calculating (estimating), by extrapolation (for example, linear extrapolation), transmission channel coefficients (transmission channel coefficients of the respective plurality of antennas) in relation to the counterpart wireless communication apparatus based on variations of the reception channel coefficients calculated by the reception channel coefficient calculation units 120-1 and 120-2 to 120-n, absolute value calculation units 140-1 and 140-2 to 140-n for calculating absolute values of the transmission channel coefficients calculated by the transmission channel coefficient calculation units 130-1 and 130-2 to 130-n, a threshold calculation unit 150 for calculating a threshold based on the reception channel coefficients calculated by the reception channel coefficient calculation units 120-1 and 120-2 to 120-n, different value calculation units 155-1 and 155-2 to 155-n for calculating difference values between the absolute values calculated by the absolute value calculation units 140-1 and 140-2 to 140-n and the threshold calculated by the threshold calculation unit 150, comparison units 160-1 and 160-2 to 160-n for comparing the absolute values calculated by the absolute value calculation units 140-1 and 140-2 to 140-n and the threshold calculated by the threshold calculation unit 150, transmission channel coefficient correction units 170-11 and 170-12 to 170-1n for correcting the transmission channel coefficients calculated by the transmission channel coefficient calculation units 130-1 and 130-2 to 130-n, a weight calculation unit 180 for calculating weights based on the transmission channel coefficients corrected by the transmission channel coefficient correction units 170-11 and 170-12 to 170-1n, and transmission units 190-1 and 190-2 to 190-n for transmitting radio signals based on the transmission channel coefficients corrected by the transmission channel coefficient correction units 170-11 and 170-12 to 170-1n and the weights calculated by the weight calculation unit 180 via the plurality of antennas.

The threshold calculation unit 150 calculates the greatest absolute value as the threshold, among absolute values of the reception channel coefficients calculated by the reception channel coefficient calculation units 120-1 and 120-2 to 120-n.

The transmission channel coefficient correction units 170-11 and 170-12 to 170-1n, when the absolute values are greater than the threshold as results of comparisons by the comparison units 160-1 and 160-2 to 160-n, correct the transmission channel coefficients calculated by the transmission channel coefficient calculation units 130-1 and 130-2 to 130-n, respectively, based on the difference values calculated by the difference value calculation units 155-1 and 155-2 to 155-n.

Figure 13:
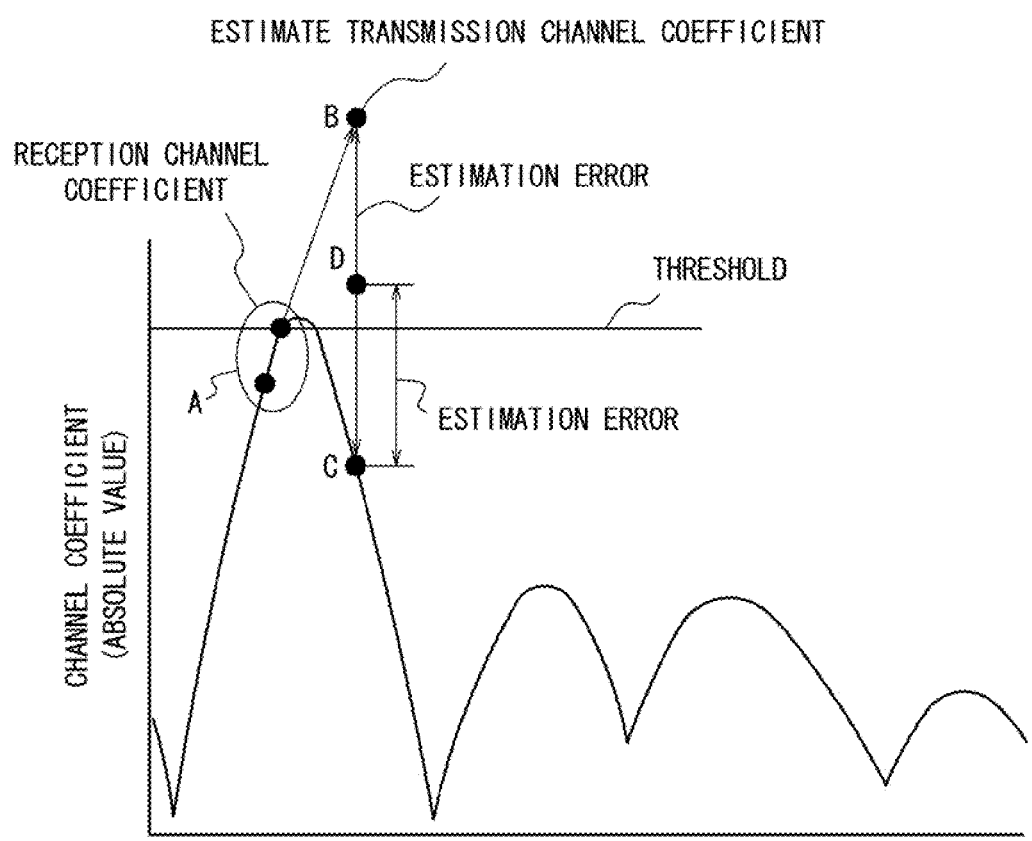
FIG. 13 is a diagram illustrating an example of the fluctuation of the transmission channel coefficient, for explaining the correcting operation of the transmission channel coefficient according to the seventh embodiment.

Next, the correcting operation of the transmission channel coefficient according to the seventh embodiment is explained based on FIG. 13.

Under circumstances with a number of scattering objects such as in an urban area, channel coefficients (reception channel coefficients and transmission channel coefficients) between the wireless communication apparatus (base station) 100 and the counterpart wireless communication apparatus (terminal) independently fluctuate in accordance with Rayleigh distribution. In such a condition, when there is no great changes in a distance between the wireless communication apparatus 100 and the counterpart wireless communication apparatus, transmission power from the counterpart wireless communication apparatus, or arrangement of the scattering objects around the wireless communication apparatus, the probability of a transmission channel coefficient whose absolute value is greater than a certain value being generated is very low. Whereas, when the transmission channel coefficient is estimated (calculated) by linear extrapolation and the likes, there is "a case where a transmission channel coefficient greater than a certain absolute value is calculated (hereinafter referred to as a case 1)", although a possibility that such a transmission channel coefficient is made at transmission is very low.

Such a calculation (estimation) of the transmission channel coefficient as the above case 1 means that the transmission channel coefficient is estimated (calculated) as a point B in FIG. 13 from a variation (increase in the absolute value, in this case) of the reception channel coefficient shown as a part A in FIG. 13. In this case, if a point C in FIG. 13 is a transmission channel coefficient which should be estimated originally, the estimation error between the "actual transmission channel coefficient" and the "estimated (calculated) transmission channel coefficient" corresponds to the distance between the point B and the point C, which is the great estimation error.

As a countermeasure, the transmission channel coefficient correction units 170-11 and 170-12 to 170-1n, when the transmission channel coefficient such as the point B shown in FIG. 13 is estimated (calculated), correct the absolute values of the transmission channel coefficients calculated by the transmission channel coefficient calculation units 130-1 and 130-2 to 130-n by decreasing the absolute values only by values approximately equal to the difference values, respectively, for example, based on the difference values calculated by the difference value calculation units 155-1 and 155-2 and 155-n so that the absolute values are corrected to a value of point D, which is located near the threshold, as shown in FIG. 13. Thereby, the estimation error is minimized to the distance between the point D and the point C.

According to the seventh embodiment, by correcting the absolute value of the transmission channel coefficient which is considered to occur with a low probability, among absolute values of the transmission channel coefficients calculated (estimated) by extrapolation (linear extrapolation, for example), it is thus possible to reduce the calculation error (estimation error) of the transmission channel coefficient. Since the calculation error (estimation error) of the transmission channel coefficient is minimized, it is possible to improve calculation accuracy (estimation accuracy) of the transmission channel coefficient. Hence, it is possible to obtain good communication quality by preventing deterioration of communication quality caused by the fluctuation of the transmission channel coefficient because of rapid movement of the counterpart wireless communication apparatus (terminal) and the likes.

Embodiment 8

Figure 14:
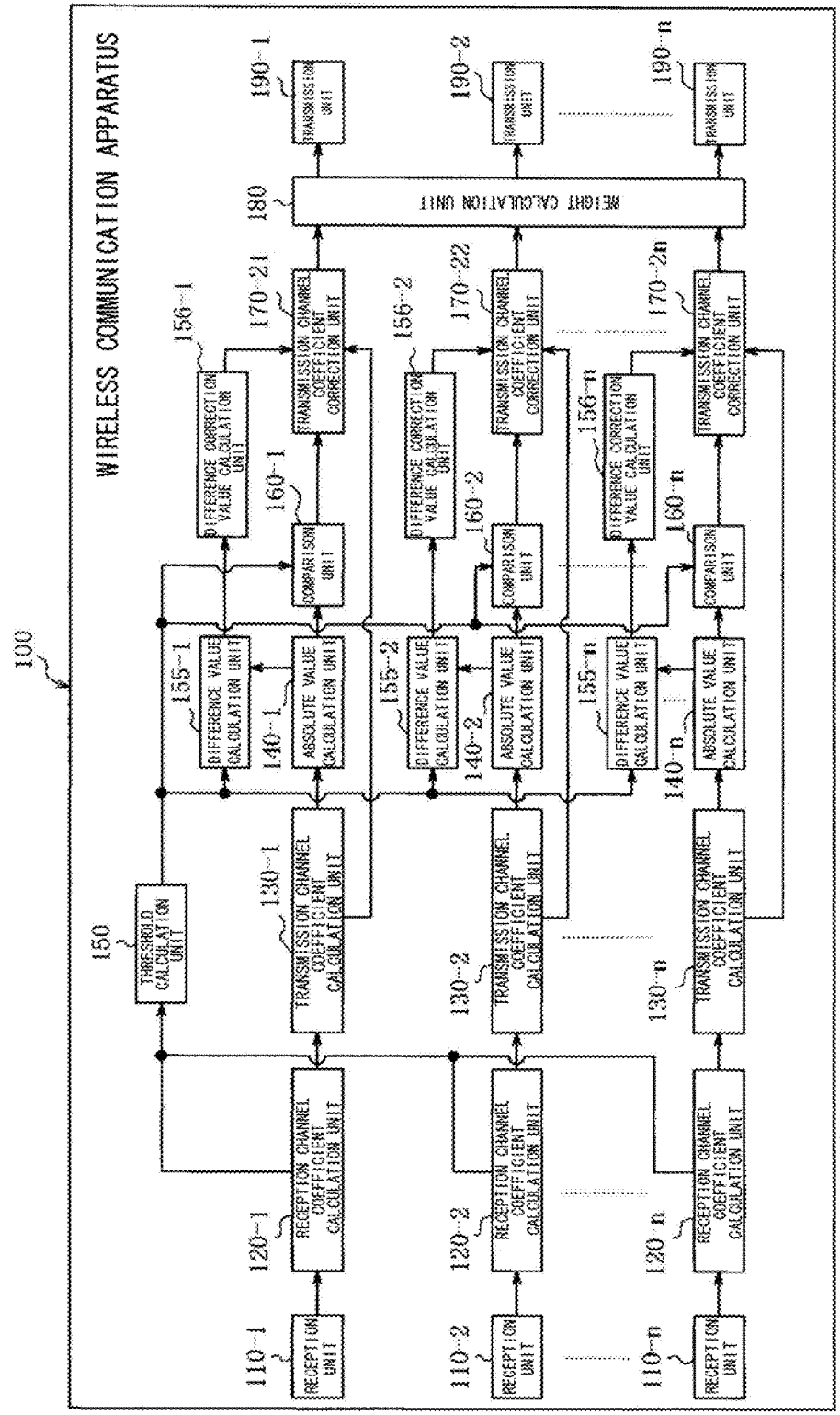
FIG. 14 is a block diagram illustrating a schematic constitution of a wireless communication apparatus according to an eighth embodiment applying the wireless communication method of the present invention.

FIG. 14 is a block diagram illustrating a schematic constitution of a wireless communication apparatus according to an eighth embodiment applying the wireless communication method of the present invention. A wireless communication apparatus 100 according to the present embodiment has the same constitution as the wireless communication apparatus 100 of the above seventh embodiment, except for having difference correction value calculation units 156-1 and 156-2 to 156-n in addition, and transmission channel coefficient correction units 170-21 and 170-22 to 170-2n in place of the transmission channel coefficient correction units 170-11 and 170-12 to 170-1n.

The difference correction value calculation units 156-1 and 156-2 to 156-n calculate difference correction values αB (αB1, αB2 to αBn) by multiplying difference values B calculated by the difference value calculation units 155-1 and 155-2 to 155-n (respect difference values B1 and B2 to Bn, when B1 is the difference value calculated by the difference value calculation unit 155-1, B2 is the difference value calculated by the difference value calculation unit 155-2, and Bn is the difference value calculated by the difference value calculation unit 155-n) by a correction coefficient α. The correction coefficient α can be a value such as 0.5, 1, 2 or the likes, and the correction coefficient α becomes greater in proportion to the difference value B, for example.

When the absolute values are greater than the threshold as results of the comparisons by the comparison units 160-1 and 160-2 to 160-n, the transmission channel coefficient correction units 170-21 and 170-22 to 170-2n correct the transmission channel coefficients calculated by the transmission channel coefficient calculation units 130-1 and 130-2 to 130-n, so as to satisfy the following formula (4), that is, by subtracting the difference correction values αB (αB1 and αB2 to αBn) calculated by the difference correction value calculation units 156-1 and 156-2 to 156-n from the absolute values calculated by the absolute value calculation units 140-1 and 140-2 to 140-n, respectively. At that time, the transmission channel coefficient correction units 170-21 and 170-22 to 170-2n correct the absolute values of the transmission channel coefficients, while holding the phase components of the transmission channel coefficients calculated by the transmission channel coefficient calculation units 130-1 and 130-2 to 130-n.

[Formula 4]

$$|\hat{H}_i| = |H_i| - \alpha B \quad (4)$$

provided that
$\hat{H}_i$: complex channel coefficient after correction
| |: absolute value operation
$H_i$: complex channel coefficient before correction
αB: the value calculated by multiplying the difference value B, between the threshold and the absolute value calculated by the absolute value calculation unit, by the correction coefficient α.

Figure 15:
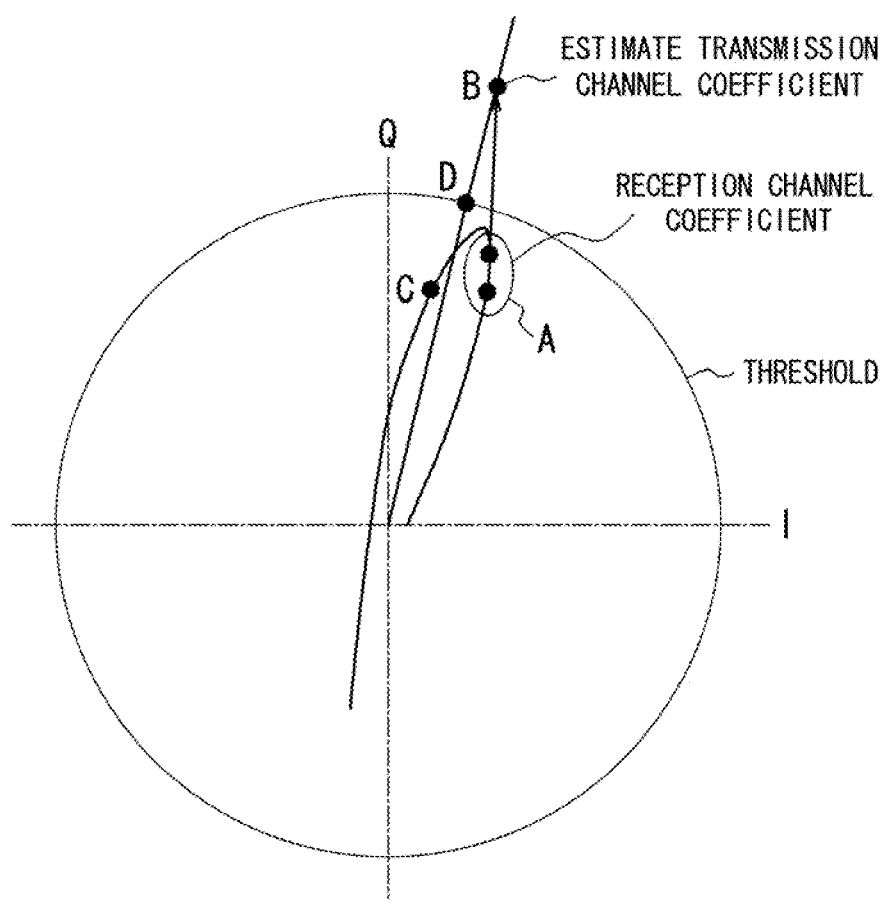
FIG. 15 is a diagram illustrating an example of the fluctuation of the transmission channel coefficient on the complex plane, for explaining the correcting operation of the transmission channel coefficient according to the eighth embodiment.

Next, the correcting operation of the transmission channel coefficient according to the eighth embodiment is explained based on FIG. 15.

Such a calculation (estimation) of the transmission channel coefficient as the above case 1 means that the transmission channel coefficient is estimated (calculated) as a point B in FIG. 15 from a variation (increase in the absolute value, in this case) of the reception channel coefficient shown as a part A in FIG. 15. In this case, if a point C in the figure is a transmission channel coefficient which should be estimated originally, the estimation error between the "actual transmission channel coefficient" and the "estimated (calculated) transmission channel coefficient" corresponds to the distance between the point B and the point C, which is the great estimation error.

As a countermeasure, the transmission channel coefficient correction units 170-21 and 170-22 to 170-2n, when the transmission channel coefficient such as the point B shown in FIG. 15 is estimated (calculated), correct the transmission channel coefficients calculated by the transmission channel coefficient calculation units 130-1 and 130-2 to 130-n based on "the absolute values of the transmission channel coefficients and the difference correction values αB1 and αB2 to αBn calculated by the difference correction value calculation units 156-1 and 156-2 to 156-n" (for example, correct them to a value of point D in FIG. 15, which is located near the threshold) by use of the formula (4), while holding the phase components of the transmission channel coefficients. Thereby, the estimation error is minimized to the distance between the point D and the point C. It is to be noted that, the absolute value of the transmission channel coefficient after correction falls equal to or below the threshold when the correction coefficient α is set to a value 1 or greater, while the absolute value of the transmission channel coefficient after correction becomes greater than the threshold when the correction coefficient α is set to a value less than 1.

According to the eighth embodiment, by correcting the absolute value of the transmission channel coefficient which is considered to occur with a low probability, among the absolute values of the transmission channel coefficients calculated (estimated) by extrapolation (linear extrapolation, for example), in consideration of the phase variation of the propagation channel, it is thus possible to reduce the calculation error (estimation error) of the transmission channel coefficient. Since the calculation error (estimation error) of the transmission channel coefficient is minimized, it is possible to improve calculation accuracy (estimation accuracy) of the transmission channel coefficient. Hence, it is possible to obtain good communication quality by preventing deterioration of communication quality caused by the fluctuation of the transmission channel coefficient because of rapid movement of the counterpart wireless communication apparatus (terminal) and the likes.

Embodiment 9

Figure 16:
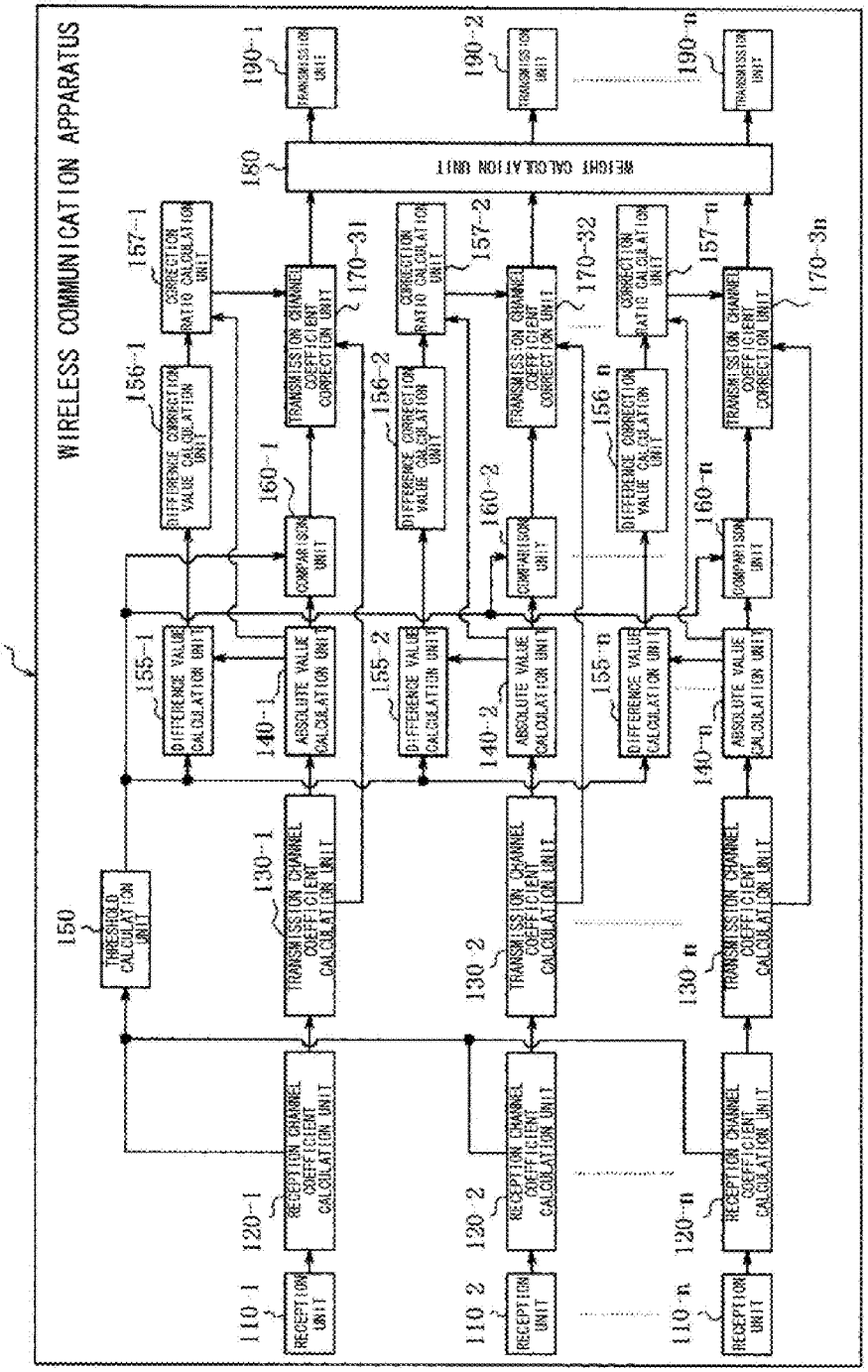
FIG. 16 is a block diagram illustrating a schematic constitution of a wireless communication apparatus according to a ninth embodiment applying the wireless communication method of the present invention.

FIG. 16 is a block diagram illustrating a schematic constitution of a wireless communication apparatus according to a ninth embodiment applying the wireless communication method of the present invention. A wireless communication apparatus 100 according to the present embodiment has the same constitution as the wireless communication apparatus 100 of the above eighth embodiment, except for having correction ratio calculation units 157-1 and 157-2 to 157-n in addition, and transmission channel coefficient correction units 170-31 and 170-32 to 170-3n in place of the transmission channel coefficient correction units 170-21 and 170-22 to 170-2n.

The correction ratio calculation units 157-1 and 157-2 to 157-n calculate correction ratios as follows, by use of the absolute values calculated by the absolute value calculation units 140-1 and 140-2 to 140-n. More specifically, the correction ratio calculation units 157-1 and 157-2 to 157-n calculate correction ratios by subtracting the difference correction values αB (αB1 and αB2 to αBn), which are calculated by multiplying the difference values B (respective difference values B1 and B2 to Bn, when B1 is the difference value calculated by the difference value calculation unit 155-1, B2 is the difference value calculated by the difference value calculation unit 155-2, and Bn is the difference value calculated by the difference value calculation unit 155-n) by the correction coefficient α, from the absolute values, respectively, and then dividing results thereof by the absolute values, respectively.

When the absolute values are greater than the threshold as results of the comparisons by the comparison units 160-1 and 160-2 to 160-n, the transmission channel coefficient correction units 170-31 and 170-31 to 170-3n correct the transmission channel coefficients calculated by the transmission channel coefficient calculation units 130-1 and 130-2 to 130-n using the following formula (5), that is, by multiplying the transmission channel coefficients calculated by the transmission channel coefficient calculation units 130-1 and 130-2 to 130-n by the correction ratios (a right-hand side in formula (2) except for the transmission channel coefficient Hi) calculated by the correction ratio calculation units 157-1 and 157-2 to 157-n, respectively. At that time, the transmission channel coefficient correction units 170-31 and 170-32 to 170-3n correct the absolute values of the transmission channel coefficients, while holding the phase components of the transmission channel coefficients calculated by the transmission channel coefficient calculation units 130-1 and 130-2 to 130-n.

Figure 17:
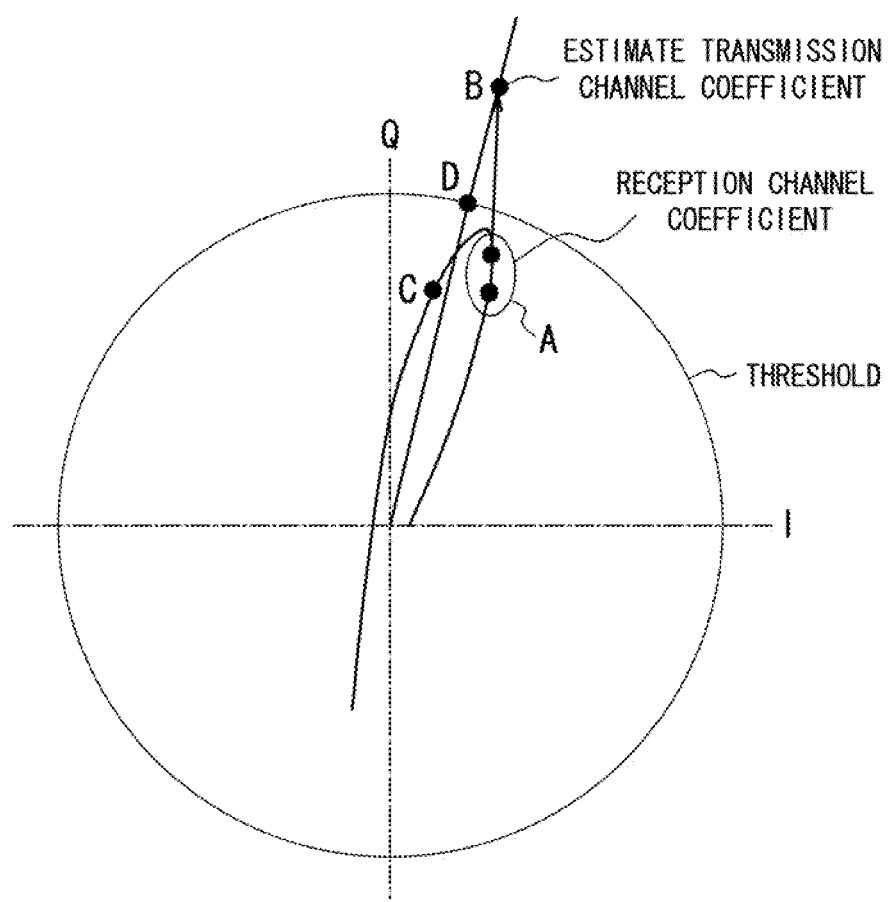
FIG. 17 is a diagram illustrating an example of the fluctuation of the transmission channel coefficient on the complex plane, for explaining the correcting operation of the transmission channel coefficient according to the ninth embodiment.

[Formula 5]

$$\hat{H}_i = H_i \times ((|H_i| - \alpha B)/|H_i|) \quad (5)$$

provided that
$\hat{H}_i$: complex channel coefficient after correction
$H_i$: complex channel coefficient before correction
αB: the value calculated by multiplying the difference value B, between the threshold and the absolute value calculated by the absolute value calculation unit, by the correction coefficient α.
| |: absolute value operation Next, the correcting operation of the transmission channel coefficient according to the ninth embodiment is explained based on FIG. 17.

Such a calculation (estimation) of the transmission channel coefficient as the above case 1 means that the transmission channel coefficient is estimated (calculated) as a point B in FIG. 17 from a variation (increase in the absolute value, in this case) of the reception channel coefficient shown as a part A in FIG. 17. In this case, if a point C in FIG. 17 is a transmission channel coefficient which should be estimated originally, the estimation error between the "actual transmission channel coefficient" and the "estimated (calculated) transmission channel coefficient" corresponds to the distance between the point B and the point C, which is the great estimation error.

As a countermeasure, the transmission channel coefficient correction units 170-31 and 170-32 to 170-3n, when the transmission channel coefficient such as the point B shown in FIG. 17 is estimated (calculated), correct the transmission channel coefficients calculated by the transmission channel coefficient calculation units 130-1 and 130-2 to 130-n, respectively, based on "the correction ratios calculated by the correction ratio calculation units 157-1 and 157-2 to 157-*n*" by use of the formula (5), while holding the phase compositions of the transmission channel coefficients (for example, correct them to a value of point D located near the threshold as shown in FIG. 17). Thereby, the estimation error is minimized to the distance between the point D and the point C.

According to the ninth embodiment, by correcting the absolute value of the transmission channel coefficient which is considered to occur with a low probability, among the absolute values of the transmission channel coefficients calculated (estimated) by extrapolation (linear extrapolation, for example), in consideration of the phase variation of the propagation channel, it is thus possible to reduce the calculation error (estimation error) of the transmission channel coefficient. Since the calculation error (estimation error) of the transmission channel coefficient is minimized, it is possible to improve calculation accuracy (estimation accuracy) of the transmission channel coefficient. Hence, it is possible to obtain good communication quality by preventing deterioration of communication quality caused by the fluctuation of the transmission channel coefficient because of rapid movement of the counterpart wireless communication apparatus (terminal) and the likes.

Embodiment 10

Figure 18:
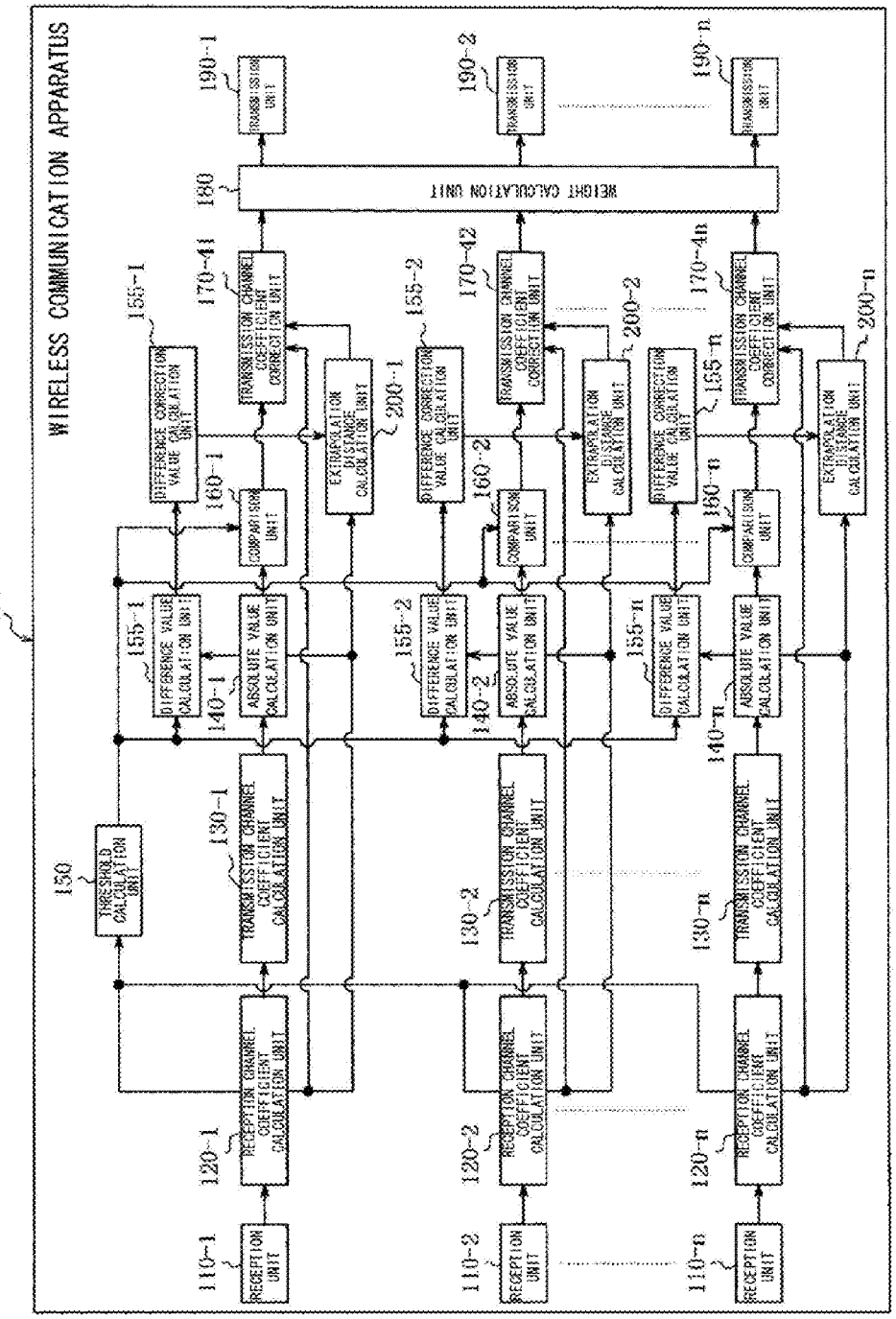
FIG. 18 is a block diagram illustrating a schematic constitution of a wireless communication apparatus according to a tenth embodiment applying the wireless communication method of the present invention.

FIG. 18 is a block diagram illustrating a schematic constitution of a wireless communication apparatus according to a tenth embodiment applying the wireless communication method of the present invention. A wireless communication apparatus 100 according to the present embodiment has the same constitution as the wireless communication apparatus 100 of the above eighth embodiment, except for having extrapolation distance calculation units 200-1 and 200-2 to 200-*n* in addition, and transmission channel coefficient correction units 170-41 and 170-42 to 170-4*n* in place of the transmission channel coefficient correction units 170-21 and 170-22 to 170-2*n*.

The extrapolation distance calculation units 200-1 and 200-2 to 200-*n* calculate extrapolation distances based on the reception channel coefficients, the transmission channel coefficients and the difference values, so as to satisfy the following formula (6).

[Formula 6]

$$\left| H_i + \left( L \times \frac{dH_i}{dt} \right) \right| = |H_i| - \alpha \beta \quad (6)$$

provided that
L: extrapolation distance
$H_i$: complex channel coefficient at reception
dHi/dt: variation of complex channel coefficient at reception
| |: absolute value operation
αB: the value calculated by multiplying the difference value B, between the threshold and the absolute value calculated by the absolute value calculation unit, by the correction coefficient α.

When the absolute values are greater than the threshold as results of the comparisons by the comparison units 160-1 and 160-2 to 160-*n*, the transmission channel coefficient correction units 170-41 and 170-42 to 170-4*n* correct the transmission channel coefficients calculated by the transmission channel coefficient calculation units 130-1 and 130-2 to 130-*n* based on the reception channel coefficients and the extrapolation distances by use of the following formula (7).

Figure 19:
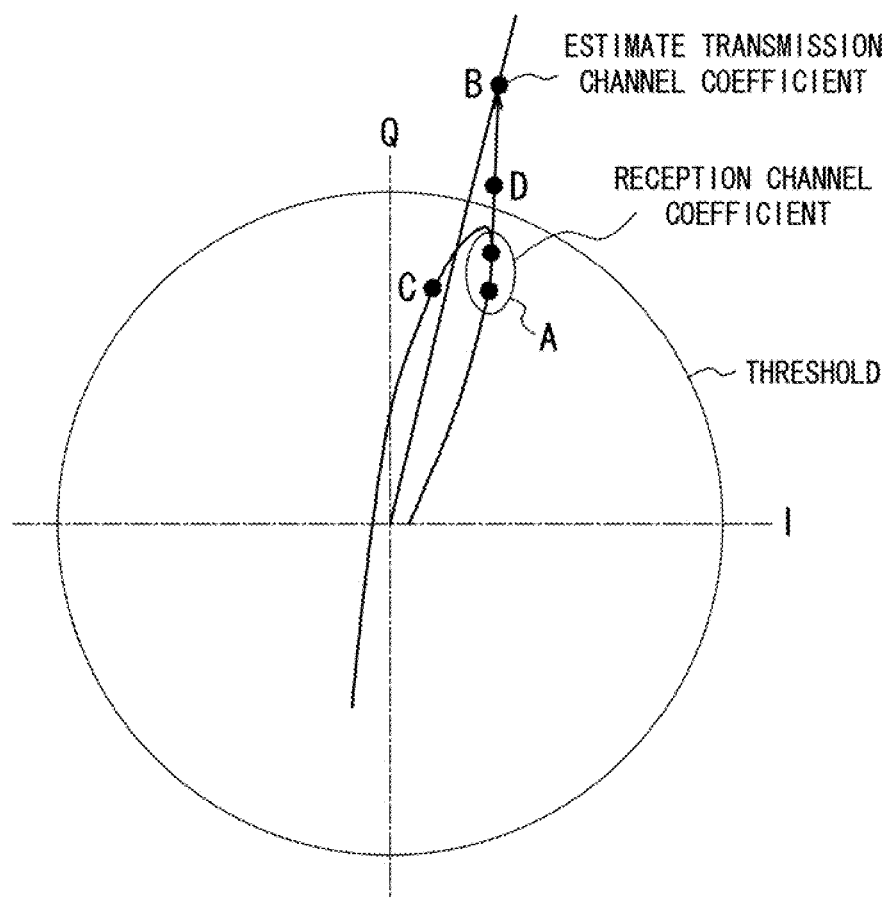
FIG. 19 is a diagram illustrating an example of the fluctuation of the transmission channel coefficient on the complex plane, for explaining the correcting operation of the transmission channel coefficient according to the tenth embodiment.

[Formula 7]

$$\hat{H}_i = H_i + \left( L \times \frac{dH_i}{dt} \right) \quad (7)$$

provided that
$\hat{H}_i$: complex channel coefficient after correction
$H_i$: complex channel coefficient at reception
L: extrapolation distance calculated by extrapolation distance calculation unit
dHi/dt: variation of complex channel coefficient at reception Next, the correcting operation of the transmission channel coefficient according to the tenth embodiment is explained based on FIG. 19.

Such a calculation (estimation) of the transmission channel coefficient as the above case 1 means that the transmission channel coefficient is estimated (calculated) as a point B in FIG. 19 from a variation (increase in the absolute value, in this case) of the reception channel coefficient shown as a part A in FIG. 19. In this case, if a point C in FIG. 19 is a transmission channel coefficient which should be estimated originally, the estimation error between the "actual transmission channel coefficient" and the "estimated (calculated) transmission channel coefficient" corresponds to the distance between the point B and the point C, which is the great estimation error.

As a countermeasure, the transmission channel coefficient correction units 170-41 and 170-42 to 170-4*n*, when the transmission channel coefficient such as the point B shown in FIG. 19 is estimated (calculated), correct the transmission channel coefficients calculated by the transmission channel coefficient calculation units 130-1 and 130-2 to 130-*n* based on "the reception channel coefficients and the extrapolation distances calculated by the extrapolation distance calculation units 200-1 and 200-2 to 200-*n*" by use of the formula (7) (for example, correct them to a value of point D, which is located near the threshold, as shown in FIG. 8). Thereby, the estimation error is minimized to the distance between the point D and the point C.

According to the tenth embodiment, by correcting the absolute value of the transmission channel coefficient which is considered to occur with a low probability, among the absolute values of the transmission channel coefficients calculated (estimated) by extrapolation (linear extrapolation, for example), in consideration of the phase variation of the propagation channel, it is thus possible to reduce the calculation error (estimation error) of the transmission channel coefficient. Since the calculation error (estimation error) of the transmission channel coefficient is minimized, it is possible to improve calculation accuracy (estimation accuracy) of the transmission channel coefficient. Hence, it is possible to obtain good communication quality by preventing deterioration of communication quality caused by the fluctuation of the transmission channel coefficient because of rapid movement of the counterpart wireless communication apparatus (terminal) and the likes.

Embodiment 11

Figure 20:
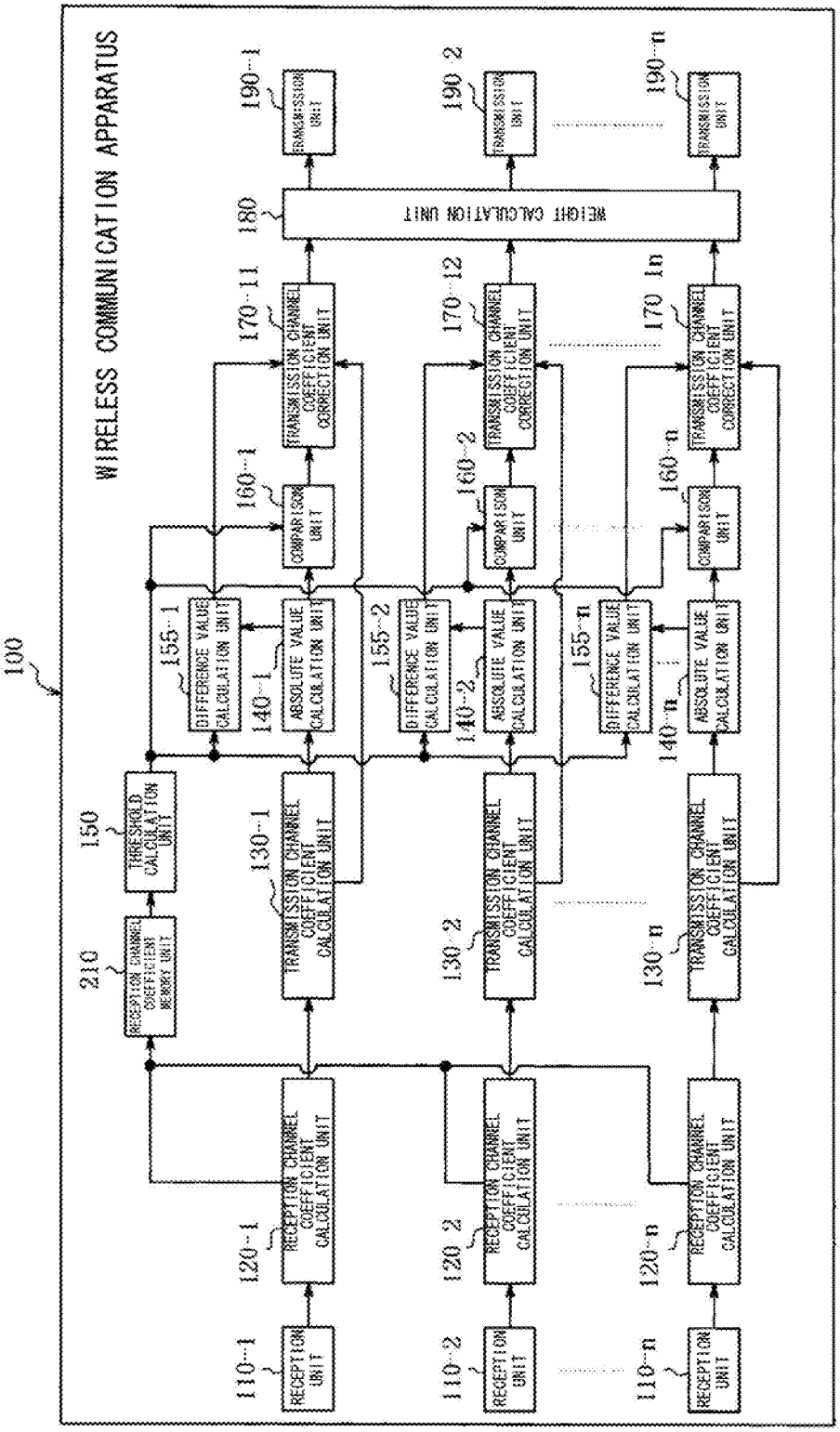
FIG. 20 is a block diagram illustrating a schematic constitution of a wireless communication apparatus according to an eleventh embodiment applying the wireless communication method of the present invention.

FIG. 20 is a block diagram illustrating a schematic constitution of a wireless communication apparatus according to an eleventh embodiment applying the wireless communication method of the present invention. A wireless communication apparatus 100 according to the present embodiment has the same constitution as the wireless communication apparatus 100 of the seventh embodiment, except for having a reception channel coefficient memory unit 210 in addition.

The reception channel coefficient memory unit 210 stores the reception channel coefficients calculated by the reception channel coefficient calculation units 120-1 and 120-2 to 120-$n$ for the plurality of frames. The threshold calculation unit 150 calculates the greatest absolute value as the threshold among the absolute values of the reception channel coefficients for the plurality of frames stored in the reception channel coefficient memory unit 210.

According to the eleventh embodiment, by correcting the absolute value of the transmission channel coefficient which is considered to occur with a low probability, among the absolute values of the transmission channel coefficients calculated (estimated) by extrapolation (linear extrapolation, for example), it is thus possible to reduce the calculation error (estimation error) of the transmission channel coefficient. Since the calculation error (estimation error) of the transmission channel coefficient is minimized, it is possible to improve calculation accuracy (estimation accuracy) of the transmission channel coefficient. Moreover, accuracy of the threshold can be improved, as the threshold is calculated by use of the absolute values of the reception channel coefficients for the plurality of frames. Hence, it is possible to obtain good communication quality by preventing deterioration of communication quality caused by the fluctuation of the transmission channel coefficient because of rapid movement of the counterpart wireless communication apparatus (terminal) and the likes.

Embodiment 12

Figure 21:
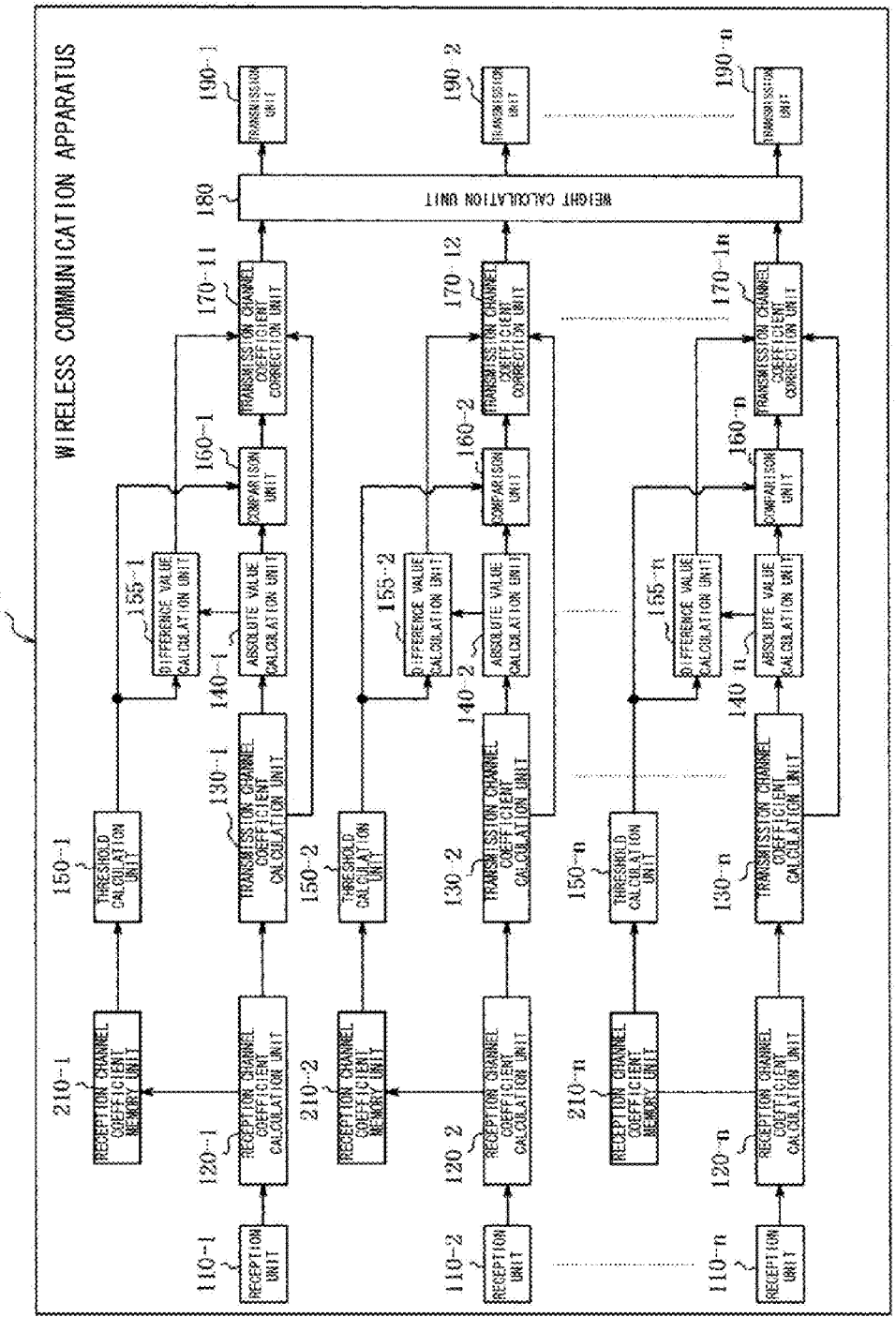
FIG. 21 is a block diagram illustrating a schematic constitution of a wireless communication apparatus according to a twelfth embodiment applying the wireless communication method of the present invention.

FIG. 21 is a block diagram illustrating a schematic constitution of a wireless communication apparatus according to a twelfth embodiment applying the wireless communication method of the present invention. A wireless communication apparatus 100 according to the present embodiment has the same constitution as the wireless communication apparatus 100 of the above eleventh embodiment, except for having reception channel coefficient memory units 210-1 and 210-1 to 210-$n$ in place of the reception channel coefficient memory unit 210 provided in common, and threshold calculation units 150-1 and 150-2 to 150-$n$ in place of the threshold calculation unit 150 provided in common.

The reception channel coefficient memory units 210-1 and 210-2 to 210-$n$ store the reception channel coefficients calculated by the reception channel coefficient calculation units 120-1 and 120-2 to 120-$n$, respectively, for the plurality of frames.

The threshold calculation units 150-1 and 150-2 to 150-$n$ calculate the greatest absolute values as the thresholds, among absolute values of the reception channel coefficients for the plurality of frames stored in the reception channel coefficient memory units 210-1 and 210-2 to 210-$n$, respectively.

In addition, the comparison units 160-1 and 160-2 to 160-$n$ according to the present embodiment compare the thresholds of respective antennas calculated by the threshold calculation units 150-1 and 150-2 to 150-$n$ and the absolute values of the transmission channel coefficients of the respective plurality of antennas calculated by the absolute value calculation units, for corresponding antennas, respectively.

According to the twelfth embodiment, by correcting the absolute value of the transmission channel coefficient which is considered to occur with a low probability, among the absolute values of the transmission channel coefficients calculated (estimated) by extrapolation (linear extrapolation, for example), it is thus possible to reduce the calculation error (estimation error) of the transmission channel coefficient. Since the calculation error (estimation error) of the transmission channel coefficient is minimized, it is possible to improve calculation accuracy (estimation accuracy) of the transmission channel coefficient. Moreover, accuracy of the threshold can be improved, as the threshold is calculated by use of the absolute values of the reception channel coefficients for the plurality of frames. Furthermore, even in a case where distribution of the transmission channel coefficients in relation to the counterpart wireless communication apparatus (terminal) is different for each antenna because of influence of shadowing, it is possible to correct the absolute value of the transmission channel coefficient efficiently. Hence, it is possible to obtain good communication quality by preventing deterioration of communication quality caused by the fluctuation of the transmission channel coefficient because of rapid movement of the counterpart wireless communication apparatus (terminal) and the likes.

Embodiment 13

FIG. 22 is a block diagram illustrating a schematic constitution of a wireless communication apparatus according to a thirteenth embodiment applying the wireless communication method of the present invention. A wireless communication apparatus 100 according to the present embodiment has the same constitution as the wireless communication apparatus 100 of the above seventh embodiment, except for having the reception channel coefficient memory unit 210, the transmission power information obtain unit 220 and the reception channel coefficient correction units 230-1 and 230-2 to 230-$n$, in addition.

The transmission power information obtain unit 220 obtains transmission power information from the counterpart wireless communication apparatus (terminal).

The reception channel coefficient correction units 230-1 and 230-2 to 230-$n$ correct the reception channel coefficients calculated by the reception channel coefficient calculation units 120-1 and 120-2 to 120-$n$ based on the transmission power information obtained by the transmission power information obtain unit 220. The reception channel coefficient memory units 210-1 and 210-2 to 210-$n$ store reception channel coefficients corrected by the reception channel coefficient correction units 230-1 and 230-2 to 230-$n$, respectively.

According to the thirteenth embodiment, by correcting the absolute value of the transmission channel coefficient which is considered to occur with a low probability, among the absolute values of the transmission channel coefficients calculated (estimated) by extrapolation (linear extrapolation, for example), it is thus possible to reduce the calculation error (estimation error) of the transmission channel coefficient. Since the calculation error (estimation error) of the transmission channel coefficient is minimized, it is possible to improve calculation accuracy (estimation accuracy) of the transmission channel coefficient. Moreover, accuracy of the threshold can be improved, as the threshold is calculated by use of the absolute values of the reception channel coefficients for the plurality of frames. Furthermore, even in a case where the transmission power of the counterpart wireless communication apparatus (terminal) is different for each frame, it is possible to correct the absolute value of the transmission channel coefficient. Hence, it is possible to obtain good communication quality by preventing deterioration of communication quality caused by the fluctuation of the transmission channel coefficient because of rapid movement of the counterpart wireless communication apparatus (terminal) and the likes.

It is to be understood that the thresholds calculated by the threshold calculation units 150, 150-1 and 150-2 to 150-$n$ are not limited to "the greatest absolute value among the absolute values of the reception channel coefficients" but may be a result from addition of a predetermined value to the greatest absolute value or a result from subtraction of the predetermined value from the greatest absolute value. In addition, extrapolation used by the transmission channel coefficient calculation units 130-1 and 130-2 to 130-$n$ to calculate the transmission channel coefficients is not limited to "linear extrapolation" but may be other extrapolation methods. Moreover, although the transmission channel coefficients are corrected based on the absolute values calculated by the absolute value calculation units 140-1 and 140-2 to 140-$n$ and the difference values calculated by the difference value calculation units 155-1 and 155-2 to 155-$n$ in each of the above embodiments, it becomes equivalent to an embodiment in which the thresholds calculated by the threshold calculation units 150, 150-1 and 150-2 to 150-$n$ are used instead of the absolute values calculated by the absolute value calculation units 140-1 and 140-2 to 140-$n$ by replacing the correction coefficient $\alpha$ to ($\alpha$-1).

The invention claimed is:

1. A wireless communication apparatus having a plurality of antennas comprising:
  a reception channel coefficient calculation unit for calculating a reception channel coefficient of each of the plurality of antennas;
  a transmission channel coefficient calculation unit for calculating a transmission channel coefficient of each of the plurality of antennas by extrapolation, based on a variation of the reception channel coefficient calculated by the reception channel coefficient calculation unit;
  an absolute value calculation unit for calculating an absolute value of the transmission channel coefficient calculated by the transmission channel coefficient calculation unit;
  a threshold calculation unit for calculating a threshold based on the reception channel coefficient calculated by the reception channel coefficient calculation unit;
  a comparison unit for comparing the absolute value calculated by the absolute value calculation unit and the threshold calculated by the threshold calculation unit; and
  a correction unit, when the absolute value is greater than the threshold as a result of a comparison by the comparison unit, for correcting the transmission channel coefficient calculated by the transmission channel coefficient calculation unit, so as to match the absolute value to the threshold.

2. The wireless communication apparatus according to claim 1, wherein the correction unit corrects the absolute value of the transmission channel coefficient, while holding a phase component of the transmission channel coefficient calculated by the transmission channel coefficient calculation unit.

3. The wireless communication apparatus according to claim 1, further comprising an extrapolation distance calculation unit for calculating an extrapolation distance based on the reception channel coefficient calculated by the reception channel coefficient calculation unit, the transmission channel coefficient calculated by the transmission channel coefficient calculation unit and the threshold calculated by the threshold calculation unit,
  wherein the correction unit corrects the transmission channel coefficient calculated by the transmission channel coefficient calculation unit based on the extrapolation distance calculated by the extrapolation distance calculation unit and the reception channel coefficient calculated by the reception channel coefficient calculation unit.

4. The wireless communication apparatus according to claim 1, further comprising a channel coefficient memory unit for storing reception channel coefficients for a plurality of frames of each of the plurality of antennas, calculated by the reception channel coefficient calculation unit,
  wherein the threshold calculation unit calculates the threshold based on the reception channel coefficients for the plurality of frames stored in the channel coefficient memory unit.

5. The wireless communication apparatus according to claim 1, wherein the threshold calculation unit calculates the threshold individually for each of the plurality of antennas, and the comparison unit compares the threshold of each of the plurality of antennas calculated by the threshold calculation unit and the absolute value of each of the plurality of antennas calculated by the absolute value calculation unit, with respect to each corresponding antenna.

6. The wireless communication apparatus according to claim 1, further comprising a transmission power information obtain unit for obtaining transmission power information of a counterpart wireless communication apparatus and a reception channel coefficient correction unit for correcting the reception channel coefficient calculated by the reception channel coefficient calculation unit,
  wherein the reception channel coefficient correction unit corrects the reception channel coefficient calculated by the reception channel coefficient calculation unit, based on the transmission power information obtained by the transmission power information obtain unit.

7. A wireless communication apparatus having a plurality of antennas comprising:
  a reception channel coefficient calculation unit for calculating a reception channel coefficient of each of the plurality of antennas;
  a transmission channel coefficient calculation unit for calculating a transmission channel coefficient of each of the plurality of antennas by extrapolation, based on a variation of the reception channel coefficient calculated by the reception channel coefficient calculation unit;
  an absolute value calculation unit for calculating an absolute value of the transmission channel coefficient calculated by the transmission channel coefficient calculation unit;
  a threshold calculation unit for calculating a threshold based on the reception channel coefficient calculated by the reception channel coefficient calculation unit;
  a comparison unit for comparing the absolute value calculated by the absolute value calculation unit and the threshold calculated by the threshold calculation unit;
  a difference value calculation unit for calculating a difference value between the absolute value calculated by the absolute value calculation unit and the threshold calculated by the threshold calculation unit; and
  a correction unit, when the absolute value is greater than the threshold as a result of a comparison by the comparison unit, for correcting the transmission channel coefficient calculated by the transmission channel coefficient calculation unit based on the difference value calculated by the difference value calculation unit.

8. The wireless communication apparatus according to claim 7, further comprising a difference correction value calculation unit for calculating a difference correction value by multiplying the difference value, calculated by the difference value calculation unit, by a correction coefficient,
wherein the correction unit corrects the transmission channel coefficient, calculated by the transmission channel coefficient calculation unit, by subtracting the difference correction value calculated by the difference correction value calculation unit from the absolute value calculated by the absolute value calculation unit.

9. The wireless communication apparatus according to claim 7, wherein the correction unit corrects the absolute value of the transmission channel coefficient, while holding a phase component of the transmission channel coefficient calculated by the transmission channel coefficient calculation unit.

10. The wireless communication apparatus according to claim 9, further comprising a difference correction value calculation unit for calculating a difference correction value by multiplying the difference value, calculated by the difference value calculation unit, by a correction coefficient and a correction ratio calculation unit for calculating a correction ratio by dividing a value, calculated by subtracting the difference correction value calculated by the difference correction value calculation unit from the absolute value calculated by the absolute value calculation unit, by the absolute value,
wherein the correction unit corrects the transmission channel coefficient calculated by the transmission channel coefficient calculation unit by multiplying the transmission channel coefficient calculated by the transmission channel coefficient calculation unit by the correction ratio calculated by the correction ratio calculation unit.

11. The wireless communication apparatus according to claim 7, further comprising an extrapolation distance calculation unit for calculating an extrapolation distance based on the reception channel coefficient calculated by the reception channel coefficient calculation unit, the transmission channel coefficient calculated by the transmission channel coefficient calculation unit and the difference value calculated by the difference value calculation unit,
wherein the correction unit corrects the transmission channel coefficient calculated by the transmission channel coefficient calculation unit, based on the extrapolation distance calculated by the extrapolation distance calculation unit and the reception channel coefficient calculated by the reception channel coefficient calculation unit.

12. The wireless communication apparatus according to claim 7, further comprising a channel coefficient memory unit for storing reception channel coefficients for a plurality of frames of each of the plurality of antennas, calculated by the reception channel coefficient calculation unit,
wherein the threshold calculation unit calculates the threshold based on the reception channel coefficients for the plurality of frames stored in the channel coefficient memory unit.

13. The wireless communication apparatus according to claim 12, wherein the threshold calculation unit individually calculates the threshold for each of the plurality of antennas, and
the comparison unit compares the threshold of each of the plurality of antennas calculated by the threshold calculation unit and the absolute value of the transmission channel coefficient of each of the plurality of antennas calculated by the absolute value calculation unit, with respect to each corresponding antenna.

14. The wireless communication apparatus according to claim 7, further comprising a transmission power information obtain unit for obtaining transmission power information of a counterpart wireless communication apparatus and a reception channel coefficient correction unit for correcting the reception channel coefficient calculated by the reception channel coefficient calculation unit,
wherein the reception channel coefficient correction unit corrects the reception channel coefficient calculated by the reception channel coefficient calculation unit, based on the transmission power information obtained by the transmission power information obtain unit.

15. A wireless communication method for controlling wireless communication between a wireless communication apparatus having a plurality of antennas and a counterpart wireless communication apparatus, comprising:
a reception channel coefficient calculation step for calculating a reception channel coefficient of each of the plurality of antennas;
a transmission channel coefficient calculation step for calculating a transmission channel coefficient of each of the plurality of antennas by extrapolation, based on a variation of the reception channel coefficient calculated at the reception channel coefficient calculation step;
an absolute value calculation step for calculating an absolute value of the transmission channel coefficient calculated at the transmission channel coefficient calculation step;
a threshold calculation step for calculating a threshold based on the reception channel coefficient calculated at the reception channel coefficient calculation step; and
a correction step, when the absolute value is greater than the threshold, for correcting the transmission channel coefficient, calculated at the transmission channel coefficient calculation step, so as to match the absolute value to the threshold.

16. A wireless communication method for controlling wireless communication between a wireless communication apparatus having a plurality of antennas and a counterpart wireless communication apparatus, comprising:
a reception channel coefficient calculation step for calculating a reception channel coefficient of each of the plurality of antennas;
a transmission channel coefficient calculation step for calculating a transmission channel coefficient of each of the plurality of antennas by extrapolation, based on a variation of the reception channel coefficient calculated at the reception channel coefficient calculation step;
an absolute value calculation step for calculating an absolute value of the transmission channel coefficient calculated at the transmission channel coefficient calculation step;
a threshold calculation step for calculating a threshold based on the reception channel coefficient calculated at the reception channel coefficient calculation step;
a difference value calculation step for calculating a difference value between the absolute value calculated at the absolute value calculation step and the threshold calculated at the threshold calculation step; and
a correction step, when the absolute value is greater than the threshold, for correcting the transmission channel coefficient calculated at the transmission channel coefficient calculation step, based on the difference value calculated at the difference value calculation step.

* * * * *